Figure 24:
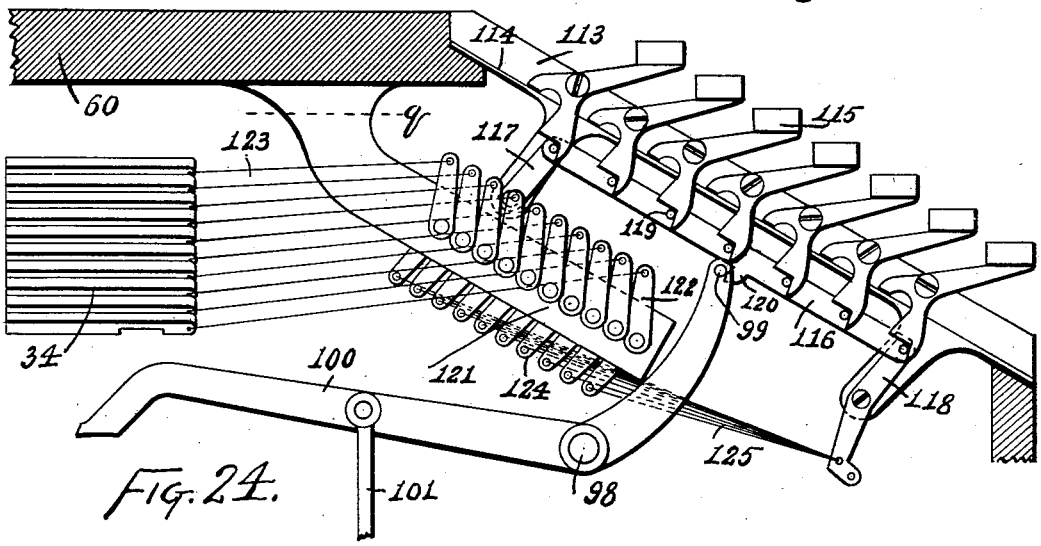

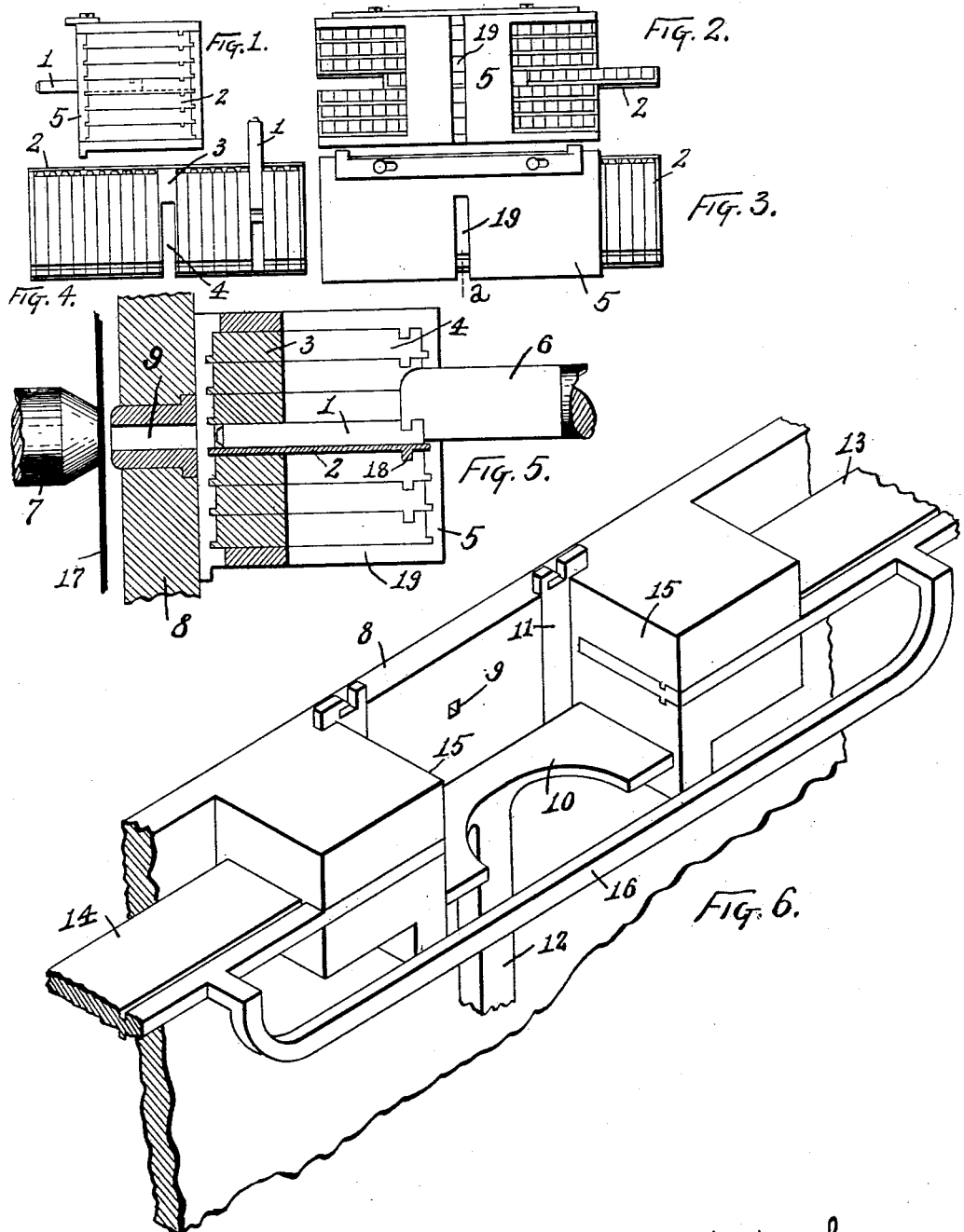

(No Model.)
T. T. HEATH.
TYPOGRAPHIC MACHINE.
No. 587,816.
Patented Aug. 10, 1897.
11 Sheets—Sheet 2.
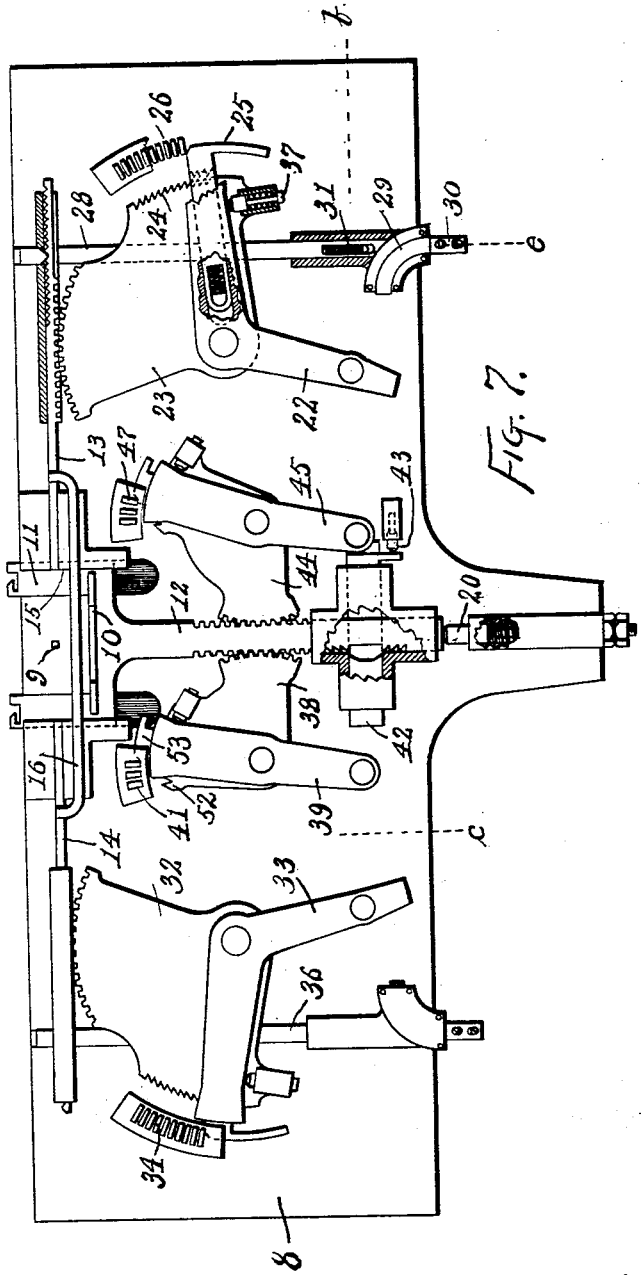
Witnesses:
E. R. Shipley.
M. S. Belden.
Thomas T. Heath
Inventor
by James W. See
Attorney.

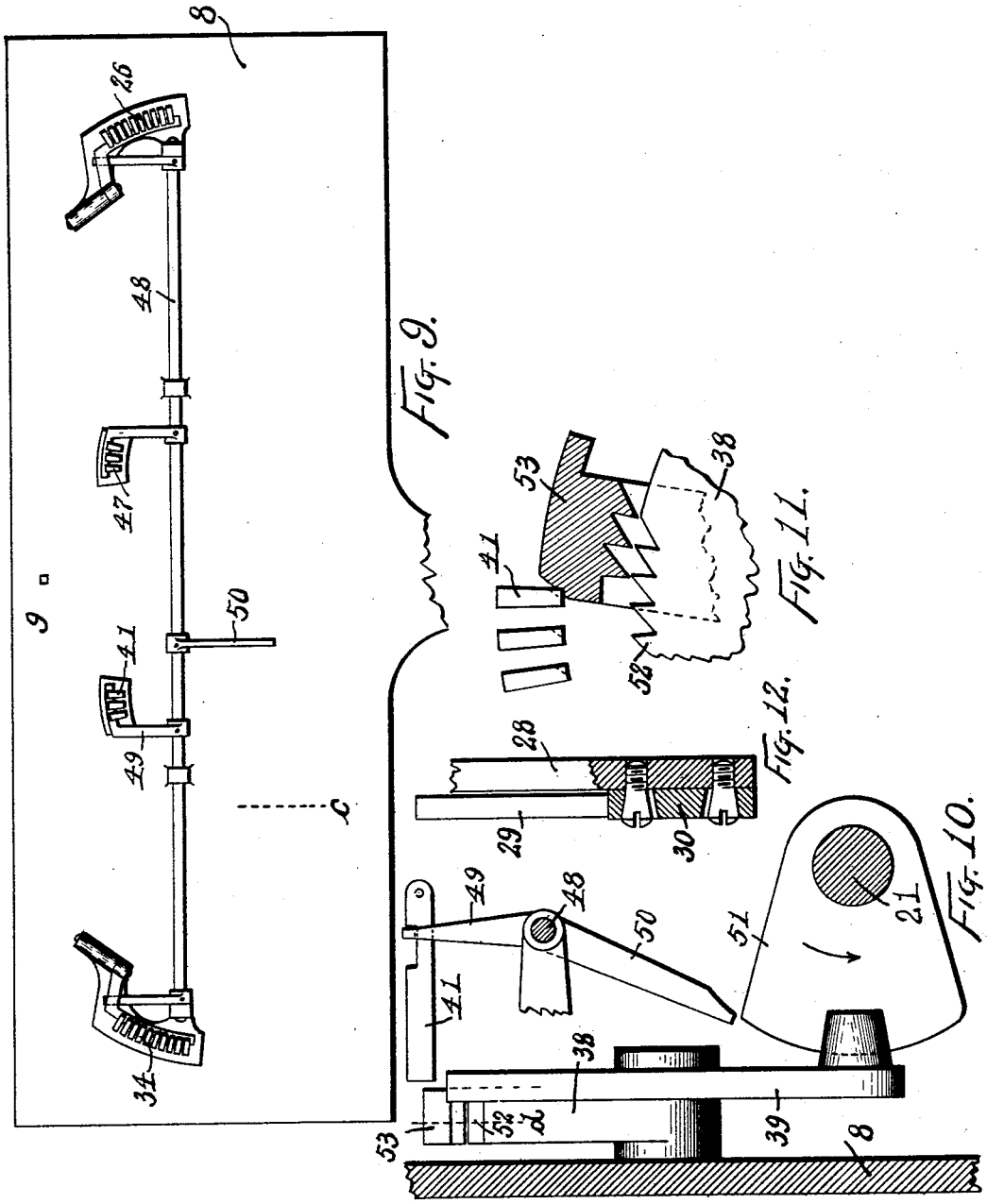

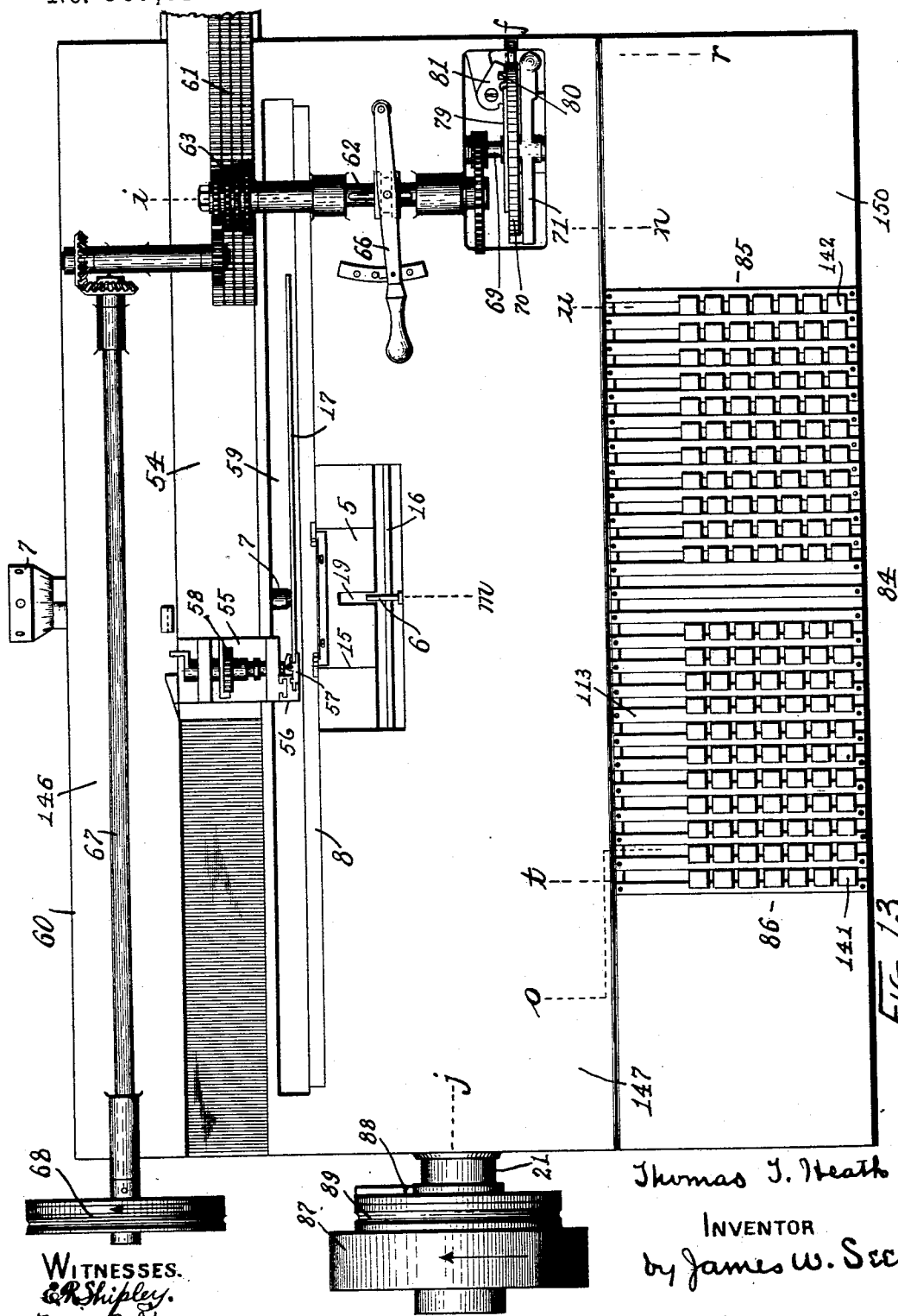

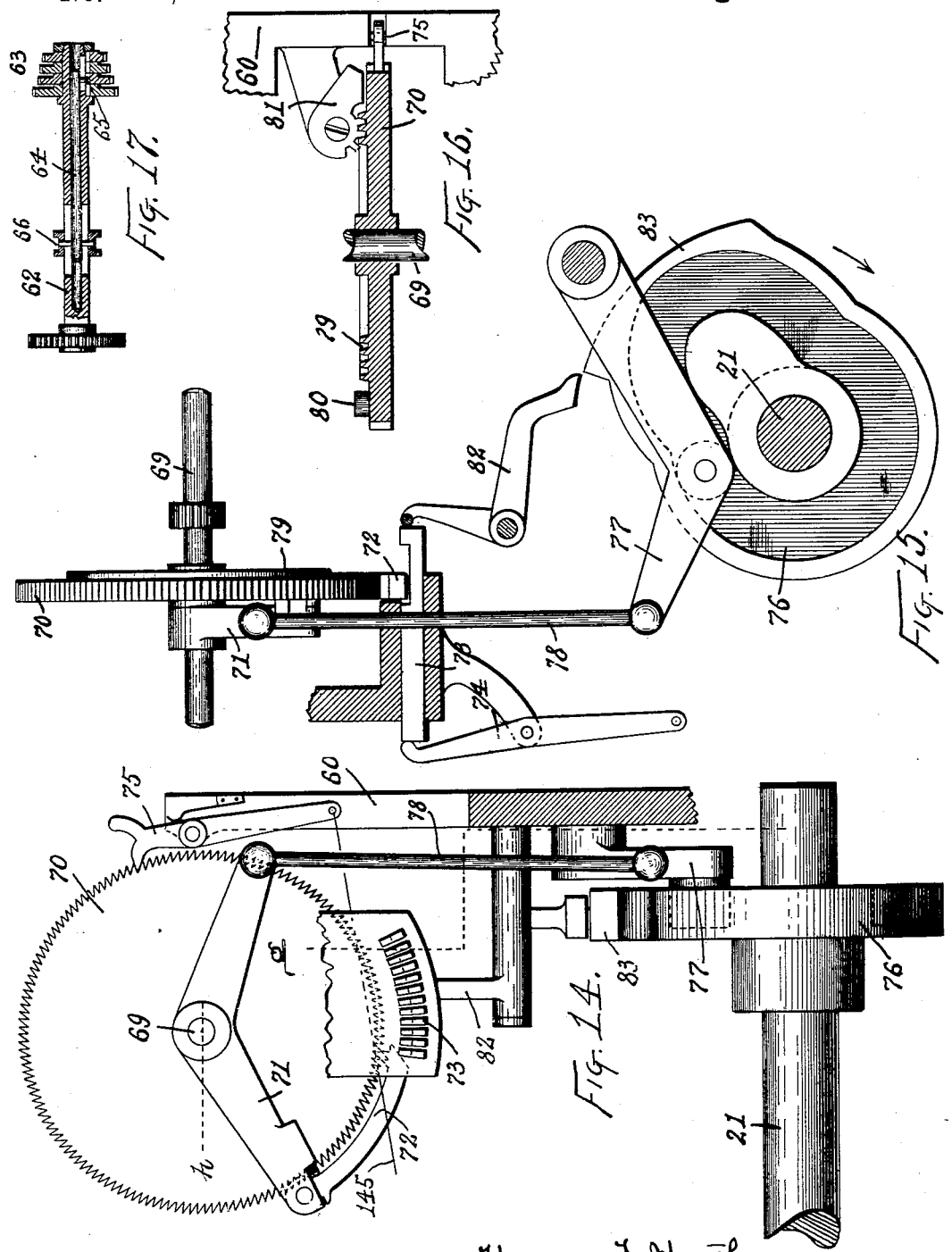

(No Model.)  11 Sheets—Sheet 6.
T. T. HEATH.
TYPOGRAPHIC MACHINE.
No. 587,816. Patented Aug. 10, 1897.
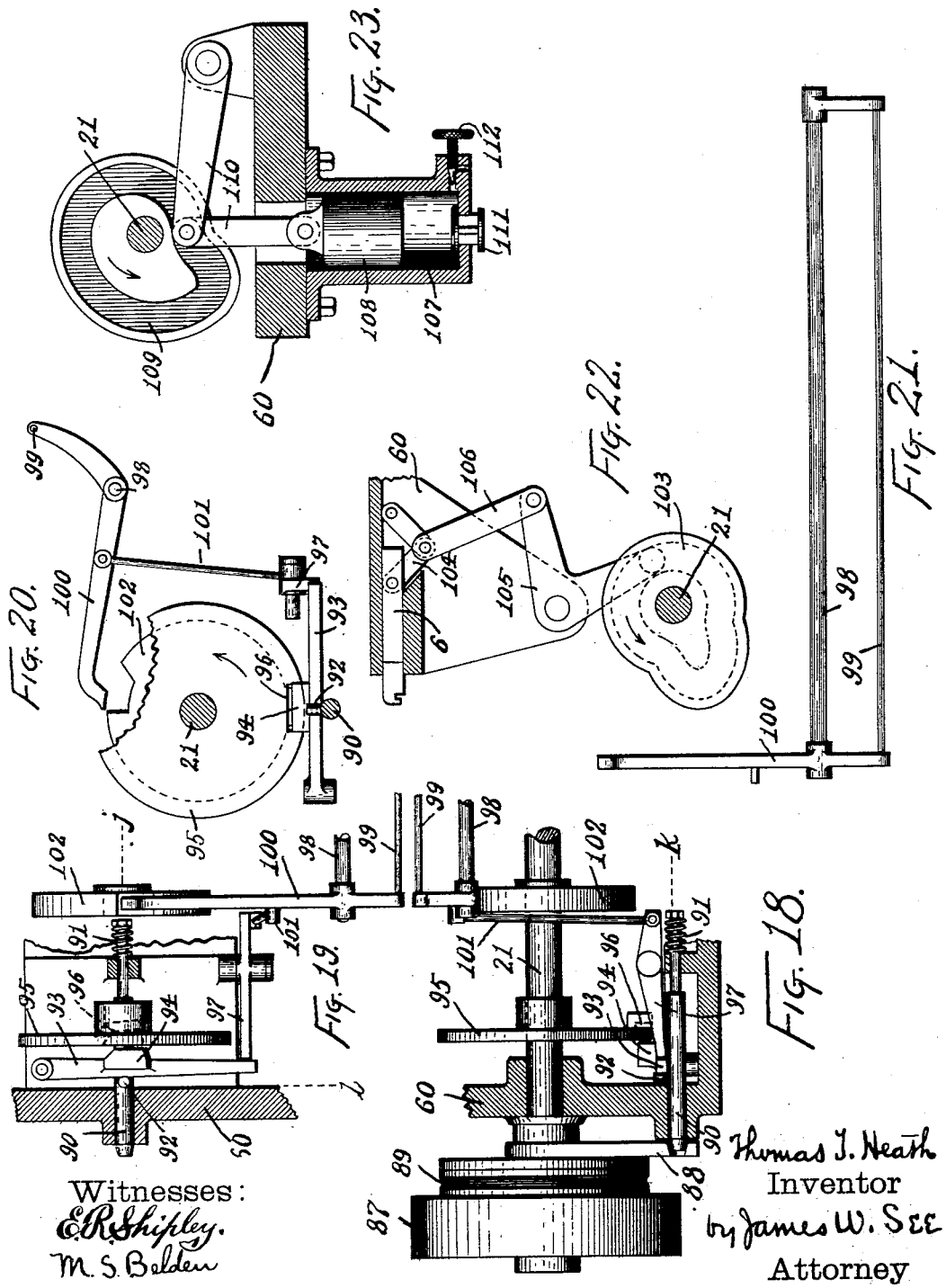

(No Model.) 11 Sheets—Sheet 7.
T. T. HEATH.
TYPOGRAPHIC MACHINE.

No. 587,816. Patented Aug. 10, 1897.

Witnesses:
E. R. Shipley.
M. S. Belden.

Thomas T. Heath
Inventor
by James W. See
Attorney (No Model.) 11 Sheets—Sheet 8.

T. T. HEATH.
TYPOGRAPHIC MACHINE.

No. 587,816. Patented Aug. 10, 1897.

Witnesses:
E. R. Shipley.
M. S. Belden.

Thomas T. Heath
Inventor
by James W. See
Attorney (No Model.) 11 Sheets—Sheet 9.
T. T. HEATH.
TYPOGRAPHIC MACHINE.
No. 587,816. Patented Aug. 10, 1897.

Witnesses:
E. R. Shipley.
M. S. Belden.

Thomas T. Heath.
Inventor
by James W. See
Attorney (No Model.) 11 Sheets—Sheet 10.
T. T. HEATH.
TYPOGRAPHIC MACHINE.
No. 587,816. Patented Aug. 10, 1897.
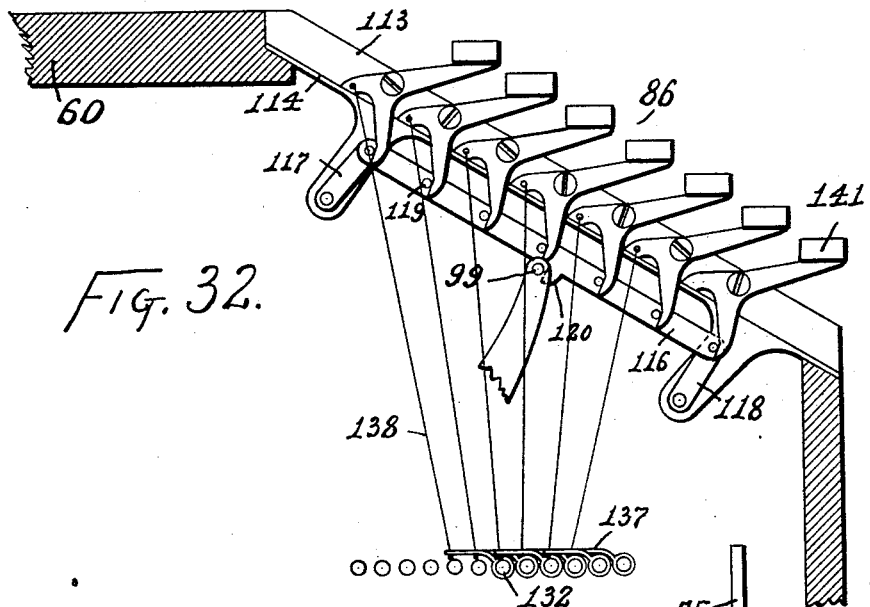
Fig. 32.
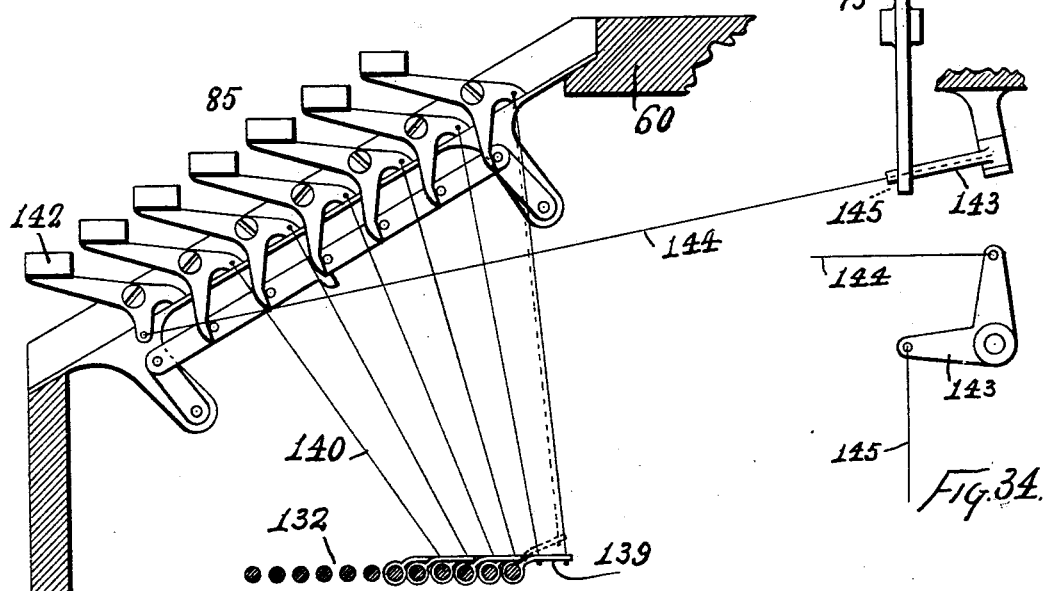
Fig. 33.
Fig. 34.
Witnesses:
E. R. Shipley.
M. S. Belden.
Thomas T. Heath
Inventor
by James W. See
Attorney

UNITED STATES PATENT OFFICE.

THOMAS T. HEATH, OF LOVELAND, OHIO.

TYPOGRAPHIC MACHINE.

SPECIFICATION forming part of Letters Patent No. 587,816, dated August 10, 1897.

Application filed January 6, 1897. Serial No. 618,138. (No model.)

*To all whom it may concern:*

Be it known that I, THOMAS T. HEATH, of Loveland, Clermont county, Ohio, have invented certain new and useful Improvements in Typographic Machines, of which the following is a specification.

This invention pertains to typographic machines designed principally for the production of matrices of matter, but of course adapted also for surface printing in simple impression or in manifold.

The improvements relate to machines of that class in which the group of type is moved to bring the given type to the impression-line where it can be acted upon by a plunger, the pad in or on which the impression takes place advancing the proper degree after each impression, the various motions being derived from a rotary shaft which is normally at rest, but makes one turn and gives one impulse to the machine upon the depression of a selected finger-key which adjusts admeasuring devices for the degree of the motions and then causes the main shaft to start on its single rotation, there being a finger-key for each type and additional finger-key for spacing purposes, &c.

The general principle of action of the machine is much similar to that set forth in my Patent No. 483,252 of September 27, 1892, the present invention pertaining to improved means for accomplishing the same general result.

The improvements will be readily understood from the following description, taken in connection with the accompanying drawings, and the features of novelty are particularly pointed out in the claims.

In describing the machine each segregable submechanism is generally illustrated and described separately, attention being later given to general assemblage and to conjoint and general action.

Figure 25:
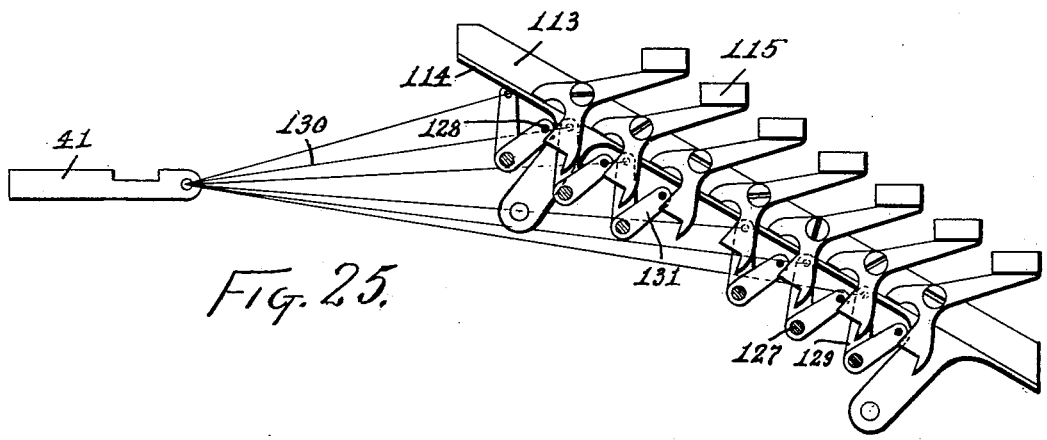
Figure 26:
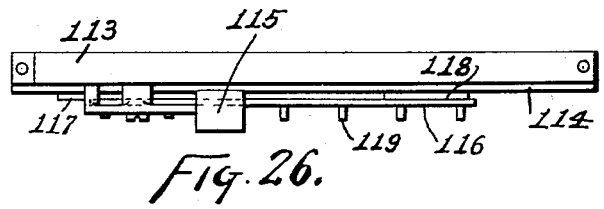
Figure 27:
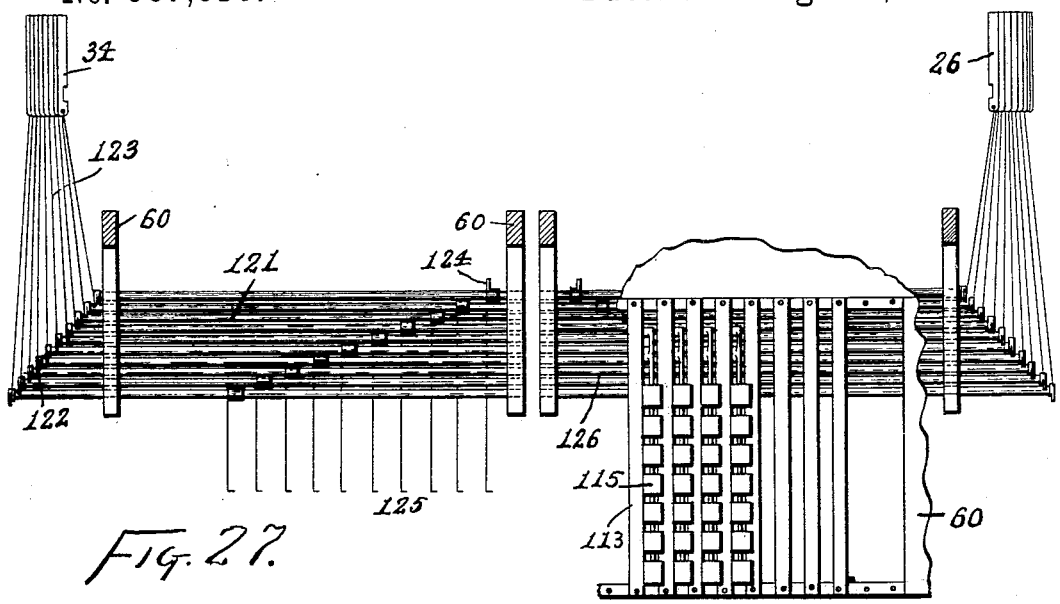
Figure 28:
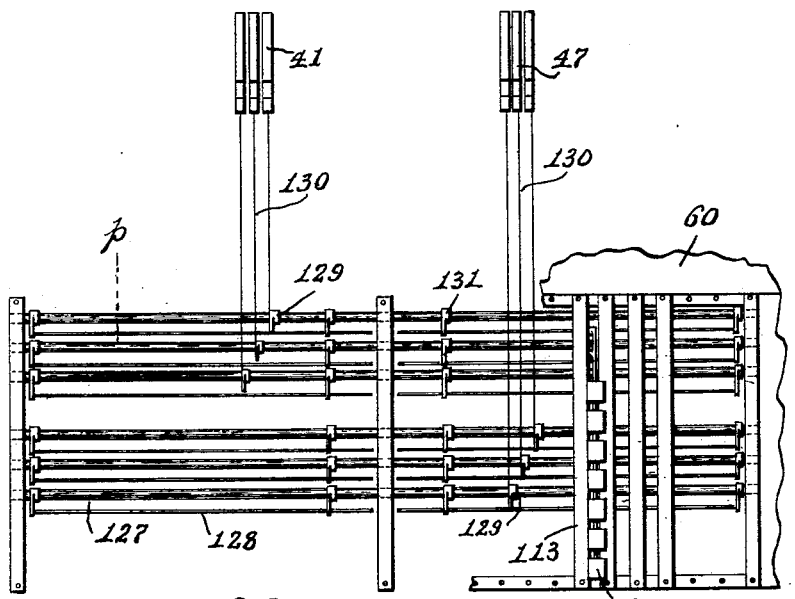
Figure 29:
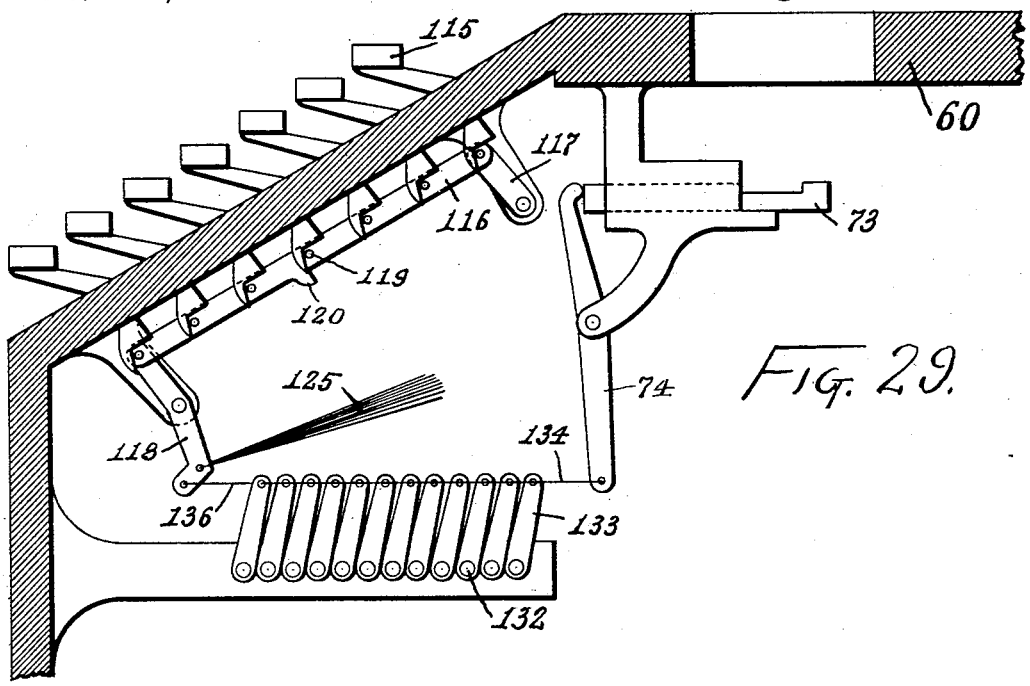
Figure 31:
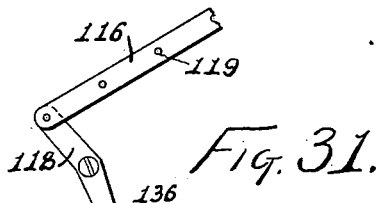
Figure 30:
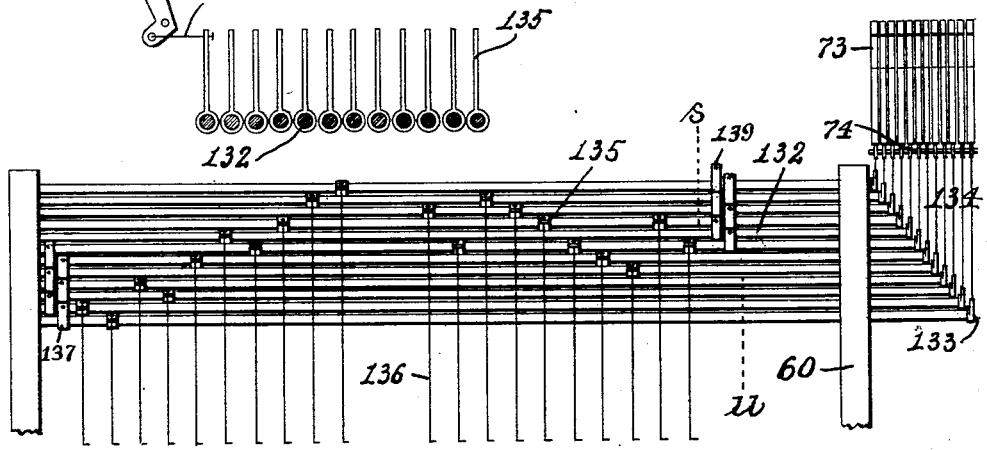

In the drawings, Figure 1 is an end elevation of the type-case with a type protruded; Fig. 2, a front elevation of the type-case, showing a type-tray shifted to the right; Fig. 3, a plan of the type-case, showing a tray shifted to the right; Fig. 4, a plan of the type-tray with a type protruded; Fig. 5, a vertical transverse section of the type-case and face-plate in the plane of line $a$ of Fig. 3; Fig. 6, a perspective view of the type-case guide, carrying-shelf, and shifter-blades; Fig. 7, a front elevation of the face-plate and the mechanism supported by it, the mechanism for restoring the measuring-pins being omitted; Fig. 8, a plan of the main shaft with its cams, main framing appearing in horizontal section in the plane of line $b$ of Fig. 7; Fig. 9, a second front elevation of the face-plate, illustrating only the measuring-pins and their restoring mechanism; Fig. 10, a vertical transverse section of the face-plate and main shaft in the plane of line $c$ of Figs. 7, 8, and 9; Fig. 11, a front elevation of the type-case lifting-segment, its pawl-arm appearing in vertical section in the plane of line $d$ of Fig. 10; Fig. 12, a side elevation of one of the lock-bars of the tray-shifting fingers, part being in section in the plane of line $e$ of Fig. 7; Fig. 13, a plan of the machine; Fig. 14, a front elevation of the pad-feeding ratchet-wheel and its immediate connections, main framing appearing in section in the plane of line $f$ of Fig. 13; Fig. 15, a side elevation of the same parts, portions appearing in vertical section in the plane of line $g$ of Fig. 14; Fig. 16, a horizontal section of the pad-feeding ratchet-wheel in the plane of line $h$ of Fig. 14; Fig. 17, a vertical longitudinal section of the transmitting feed-shaft in the plane of line $i$ of Fig. 13; Fig. 18, a front elevation of the stop-clutch and its immediate accessories, main framing appearing in vertical section in the plane of line $j$ of Figs. 13 and 19; Fig. 19, a plan of the stop-clutch accessories, main framing appearing in horizontal section in the plane of line $k$ of Fig. 18; Fig. 20, a side elevation of the same parts, the main shaft and stop-pin appearing in vertical section in the plane of line $l$ of Fig. 19; Fig. 21, a plan of the stop-clutch starting-bail; Fig. 22, a side elevation of the plunger mechanism, main framing and the main shaft appearing in vertical section in the plane of line $m$ of Fig. 13; Fig. 23, a side elevation of the shock-arresting mechanism, parts appearing in vertical section in the plane of line $n$ of Figs. 8 and 13; Fig. 24, a side elevation of a row of the type-keys in connection with the shift-measuring mechanism, main framing appearing in vertical section in the plane of line $o$ of Fig. 13; Fig. 25, a side elevation of a row of the finger-keys in connection with the measuring devices pertaining to the vertical motion of the type-case, parts appearing in vertical section in the plane of line *p* of Fig. 28; Fig. 26, a plan of one of the finger-key-supporting bars; Fig. 27, a plan of a portion of the keyboard in conjunction with the measuring devices pertaining to tray-shifting, main framing appearing in horizontal section in the plane of line *q* of Fig. 24; Fig. 28, a plan of a portion of the keyboard in connection with the measuring devices pertaining to the vertical motions of the type-case; Fig. 29, a side elevation of a row of type-keys in conjunction with the pad-feed-measuring devices, main framing appearing in vertical section in the plane of line *r* of Fig. 13, the extreme right-hand row of finger-keys being omitted from this view in order to expose the next inner row of keys; Fig. 30, a plan of the pad-feed measuring devices intermediate between the type-keys and the pad-feeding mechanism; Fig. 31, a vertical transverse section of the feed-shafts in the plane of line *s* of Fig. 30; Fig. 32, a vertical transverse section of the front portion of the machine in the plane of line *t* of Fig. 13; Fig. 33, a similar section in the plane of line *u* of Figs. 3 and 30; Fig. 34, a plan of the connecting bell-crank of the pad-backing finger-key, and Fig. 35 a vertical transverse section of the machine in the plane of line *m* of Fig. 13.

*The type-case and its movements*, (see Figs. 1 to 6, inclusive.)—1 indicates a type of rectangular cross-section and having a square notch across its upper surface near the rear end; 2, a plate with an edge upturned at each end to form a tray, in which a number of the type may lie neatly side by side, so that any given type may be slid forward to make an impression, the tray in the illustration being arranged to hold twenty type, ten at each side of the center of length of the tray, there being no type at the center; 3, a solid portion at the center of length of the tray and forming a partition between the two side groups of type in the tray; 4, a gap in the rear portion of partition 3, this gap causing the entire tray to be divided into two side portions united by a neck formed by the remaining or forward portion of partition 3; 5, a skeleton box in which are piled a number of trays, seven in the example, the front and rear edges of the trays sliding in grooves in the front and rear walls of the box, so that any given tray can be slid endwise with reference to the pile of trays carried by the box, the box therefore containing one hundred and forty type disposed in right and left hand groups; 6, a plunger adapted for horizontal reciprocation and having its forward end hooked to engage the notches of the type, this plunger being thin, so as to freely pass in the gap 4 in the trays as the type-box is raised or lowered with reference to the plunger, which is maintained in a constant horizontal plane, the type-case being maintained normally at such level that the hook of the plunger coincides with the type in the middle tray; 7, an anvil forward in the line of the plunger and beyond the type-case and against which the material to be impressed is supported; 8, a stationary face-plate rigidly supported between the type-case and the anvil; 9, a square eye in this face-plate opposite the anvil and corresponding in position with the center of length of the central tray of the group of trays; 10, a vertically-sliding shelf on which the type-case may be set and secured; 11, guides attached to this shelf and sliding in suitable guideways in face-plate 8; 12, a downwardly-projecting stem from shelf 10 to serve in adjusting the shelf and type-case vertically; 13, a horizontal shifter-blade supported in a guide on the face-plate, the inner end of this blade being at the level of eye 9, which level corresponds with that of the middle tray of type when the type-case is on the shelf; 14, a similar shifter-blade at the left, the distance between the inner ends of the two shifter-blades corresponding with the length of the trays; 15, inwardly-facing guide-blocks rigidly carried by face-plate 8 and serving for end guides for the type-case; 16, a bar connecting the two shifter-blades, so that they slide in unison; 17, the sheet of material to be impressed; 18, ribs projecting from the bottom of each tray and engaging the notches in the type in the tray below; and 19, the general vertical rear gap formed in the box of the type-case and trays by the gaps 4 in the trays and corresponding gaps in the top and bottom of the type-box.

The term "type-box" will be used as meaning the box which contains the trays, and the term "type-case" will be used as meaning this box with its contents of trays and type.

Normally the center tray is on the level of eye 9 and the shifter-blades and no type is in the vertical plane of eye 9. If under these conditions plunger 6 were moved forward, it would move idly in gap 19 and push forward no type. If the shifter-blades be moved to the right, then blade 14 would push the middle tray to the right and bring opposite eye 9 one of the type at the left of that tray. Then if the plunger move forward it will push that type through eye 9 and against the impression material. As the tray was pushed to the right by shifter-blade 14 the right-hand end of the tray protruded into the guideway of retreating shifter-blade 13. As the notches in the type in the tray engage the rib depending from the tray above, it follows that endwise displacement of any type is impossible except as to the type at or passing gap 19, and such type are engaged by the hook of plunger 6, and the type at the protruding portion of the tray become housed in the guideway of shifter-blade 13, which has a retaining-rib in its roof. It follows that at no time is any type capable of endwise movement except under the influence of the plunger which is to move a type when brought opposite eye 9. Consequently the shifter-blades may be adjusted to bring any type in the middle tray to the impression position, the shifter-blades moving to the right to bring a left-hand type to position, and vice versa. After the impression has been made by the type, the plunger retreats and restores the type to normal position and the shifter-blades restore the tray to normal position.

Should a type be wanted from one of the lower trays, then by means of stem 12 the shelf and type-case are elevated to bring the desired tray to the impression-level, after which the tray is to be slid to bring to position the proper type. When the impression has been given, then the tray is restored to position and the type-case again lowered to central position. The use of type in the upper trays involves the downward adjustment of the type-case. Momentum and a desire for rapid action make it important that the masses in motion should move the least practicable distance. Hence in arranging the type in the type-case it is preferred that the type most used be placed in the middle tray, which calls for no vertical movements of the type-case, the type least used being placed in the uppermost and lowermost trays, which call for maximum vertical motion of the type-case, and similarly it is preferred to place at the outer ends of the trays such type as are liable to least use from the number in the given tray. This matter of arrangement will conform to established rules of the general frequency of use of characters in a given font. A type-case involves a complete font, and a font is changed by removing the type-case from the shelf and replacing it with another.

In the machine there is a finger-key pertaining to each type in the type-case. There is a normally stationary shaft to make one turn for each impulse of the machine. A turn of the shaft is to adjust stem 12 vertically if other than the central tray is needed. This is to be followed by the sliding of the shifter-blades, and then by the advance of the plunger, and then by the retreat of the plunger, and then by the restoration of the type-case to normal position. A given finger-key being pressed sets mechanism to determine the direction and degree of vertical motion of the type-case and the direction and degree of the motion of the shifter-blades, and then starts the shaft which produces the proper motions of the type-case and advances the plunger and then restores everything to normal position, the impression material being shifted for the next impression before the shaft comes to rest.

*Actuation of the type-case*, (see Figs. 7 to 12, inclusive.)—20 indicates a spring-plunger, having a normal upward limit of motion and supporting-stem 12 when the type-case is in normal position with its middle tray in the plane of eye 9 and the shifter-blades; 21, the main shaft, which appears in plan in Fig. 8, this shaft lying in front of face-plate 8 of Fig. 7, with its axis in the plane of line $b$; 22, a bell-crank pivoted to the front of the face-plate and having a pin or roller projecting from its lower arm; 23, a segment loose on the pivot of bell-crank 22 and having teeth gearing with shifter-blade 13; 24, a series of ratchet-teeth on segment 23; 25, a radially-sliding pawl carried by the upper arm of bell-crank 22, this pawl having teeth adapted to engage with teeth 24 when the pawl is pushed inwardly against the resistance of a spring holding it normally outward; 26, a segmental series of ten pins, standing forward of the outer portion of pawl 25, so that as bell-crank 22 oscillates the pawl may pass up unobstructed behind the rear ends of all of the pins; 27, a cam on the main shaft, engaging the pin or roller of bell-crank 22 and adapted, as the shaft makes one turn, to oscillate that bell-crank from its normal position through a stroke corresponding with such inward stroke of shifter-blade 13 as would slide a type-tray such distance as to bring its right-hand end type to eye 9, the cam, after giving the bell-crank this full stroke, holding the bell-crank on a dwell and then returning the bell-crank to the normal position seen in Fig. 7; 28, a vertically-sliding lock-bar, having at its upper end a tooth adapted to engage in any one of a series of twenty lock-teeth formed in shifter-blade 13; 29, a segment sliding in a guide and having its upper end in position to be engaged by the lower end of bell-crank 22, as the bell-crank completes its stroke to the right, the effect of such engagement being to slide segment 29 and push its lower end downwardly; 30, a block secured at the lower end of lock-bar 28 and having its upper surface engaged by the lower end of sliding segment 29, this block being secured to the lock-bar by two screws, having tapering bodies engaging tapering holes in the block, the centers of the screws being farther apart than the centers of the holes, as seen in Fig. 12, so that by adjusting the tapering screws the block may be delicately adjusted up or down on the lock-bar; 31, a spring holding lock-bar 28 normally up out of engagement with the lock-teeth of shifter-blade 13; 32, a segment similar to segment 23, but engaging with shifter-blade 14; 33, a bell-crank similar to bell-crank 22, but pertaining to segment 32; 34, a group of ten pins similar to pins 26 and pertaining to the pawl of bell-crank 33; 35, a cam similar to cam 46, but pertaining to bell-crank 33 and adapted, as the shaft turns, to swing bell-crank 33 to the left in the same manner as cam 27 swings bell-crank 22 to the right; 36, a lock-bar similar to lock-bar 28, but pertaining to shifter-blade 14; and 37, a spring-plunger carried by segment 23 and engaged by bell-crank 22 in such direction that when bell-crank 22 is in normal position segment 23 will be held in normal position.

Let it be remembered that the type-case resting on shelf 10 is normally at such level that its middle tray will be in line with eye 9 and the shifter-blades 13 and 14, so that if any type be needed from the middle tray no vertical adjustment of the type-case will be called for and it will only be necessary to shift a tray to bring the desired type to eye 9. Let it also be remembered that the main shaft is normally stationary and that when started into motion it makes one turn and then comes to rest. Cam 27 and the mechanism operated by it pertains to the shifting of the trays toward the left and cam 35 and the mechanism operated by it pertains to the shifting of the trays to the right. Let us assume that the tray is to be shifted to the left. If cam 27 makes a complete turn, it will rock bell-crank 22 through its full sweep and then return it to normal position. As the bell-crank made this motion the pawl 25, normally free from teeth 24, passed idly up behind the ends of pins 26, and consequently no motion was given to segment 23 and no shifting of the type-tray occurred; but if before cam 27 started to turn the lowermost one of the pins 26 was pushed rearward it would stand in the path of pawl 25. Consequently when the pawl started the pin would move the pawl inwardly and lock its teeth to teeth 24, causing segment 23 to accompany the bell-crank in its movement. The action of the pin and pawls may be well gathered from Fig. 11, which figure, however, pertains to another but essentially similar pin-and-pawl arrangement. The effect of this would be to slide shifter-blade 13 full stroke to the left, thus bringing the endmost right-hand type of the tray to eye 9, and when the cam returned the bell-crank to normal position the tray would be restored to normal position in the type-box. If, however, the uppermost one of pins 26 was the one protruded into the path of the pawl, then the bell-crank would make nine-tenths of its stroke before it became locked to segment 23, the consequence being that the tray would be shifted but one degree, corresponding with the innermost right-hand type in the tray. Similarly any one of the right-hand type in the tray will be brought to eye 9 by protruding into the path of pawl 25 the appropriate one of pins 26. Therefore the finger-key pertaining to a given type at the right-hand end of a tray needs only to be connected with the appropriate one of pins 26 to provide for the proper tray-shifting motion for that type.

Bell-crank 22 has a constant stroke regardless of whether segment 23 accompanies the bell-crank through all or a portion only of the stroke of the bell-crank. As bell-crank 22 completes its stroke to the right, representing the proper completion of the stroke of shifter-blade 13, it obviously causes lock-bar 28 to engage the shifter-blade and lock the shifter and tray and hold it locked during the dwell of the cam. Consequently the tray will be slid to proper point and then locked and held locked while the impression is being made.

When bell-crank 22 returns to normal position, it brings segment 23 and the shifters back to normal position by engaging plunger 37 as a stop. Plunger 37 would do its work if it were a rigid lug engaged by the bell-crank, but giving it the form of a spring-plunger cushions the motion and avoids shock and noise.

While bell-crank 22 is doing its work in shifting the tray to the left, as has been explained, bell-crank 33 is moved idly through its full stroke entirely free from segment 32, and segment 32 is moved idly by the movement of the shifter-blades as caused by active segment 23. Bell-cranks 22 and 33 move coincidentally, and the shifter-blades will be moved in a direction corresponding with whichever of the bell-cranks is locked to its segment. In case the tray is to be shifted to the right then bell-crank 22 makes its motion idly and bell-crank 33 is locked to its segment 32 by an appropriate one of pins 34. Finger-keys pertaining to type in the right-hand portion of trays are connected appropriately with pins 26 and finger-keys pertaining to left-hand type in the trays are appropriately connected to pins 34. The manner of connection will be later explained.

In describing the tray-shifting devices it has been assumed that the normal or middle tray was the one involved. The vertical adjustment of the type-case to bring upper or lower trays to the plane of shifting and impression will now be described.

38 indicates a segment similar to segment 23, but geared to stem 12, which vertically adjusts the type-case; 39, an arm rocking on the pivot of segment 38 like bell-crank 22 and carrying a similar spring-pawl; 40, a cam on the main shaft for oscillating arm 39; 41, a series of three pins similar to pins 26, but pertaining to the pawl of arm 39; 42, a lock-bolt sliding in a guide across behind stem 12 and having lock-teeth adapted to engage a series of teeth on stem 12, the left end of this lock-bolt being in position to be engaged by the lower end of arm 39 when that arm completes its stroke to the right; 43, a spring pressing bolt 42 to the left, so that its teeth are normally out of engagement with the lock teeth of stem 12; 44, a second segment similar to segment 38 and similarly gearing with stem 12; 45, an arm similar to arm 39, but pertaining to segment 44; 46, a cam for oscillating arm 45; and 47 a series of three pins like pins 41, but pertaining to the pawl of arm 45.

The means for vertically adjusting stem 12 are obviously similar to the means for adjusting the shifter-blades. With seven trays in the type-case there are required three degrees of upward motion and three degrees of downward motion from the normal or middle tray. Arm 45, when locked to segment 44, effects the downward adjustment of the type-case one, two, or three degrees according to which of pins 47 is protruded into the path of the pawl of arm 45, and arm 39 similarly effects the upward movement of the type-case. All finger-keys pertaining to upper trays calling for a downward motion of the type-case will be connected appropriately with pins 47 and all finger-keys pertaining to lower trays calling for an upward movement of the type-case will be connected appropriately with pins 41.

When the type-case shall have been raised or lowered by the action of arm 39 or arm 45, arm 39, at the completion of its stroke to the right, forces bolt 42 into engagement with the locking-teeth on stem 12, and consequently the type-case, after having been vertically adjusted, is accurately locked to position and held so while the impression is being made. Spring-plunger 20 normally supports stem 12 in its normal position, but yields downwardly as the stem descends.

It will be understood that in dealing with the middle tray pins 41 and 47 do not act, but as there are no type at the center of the trays pins 26 or 34 always come into action when a type is to be impressed. If an upper or lower tray is needed, then a pin in group 41 or 47 will be employed as well as a pin in one of the other two groups. After a pin has been adjusted to active position and the type adjustment has been made and after the type-adjusting parts have been returned to normal position the pin or pins which have been protruded must be restored to normal idle position. The device for this purpose will now be explained with reference to Figs. 9 and 10.

48 indicates a shaft journaled in bearings on the front of face-plate 8 in front of the mechanism which has been heretofore described; 49, arms fast on this shaft and having connections with the pins through the medium of notches in the pins; 50, a cam-arm fast on shaft 48; 51, a cam on the main shaft and adapted to engage arm 50; 52, a ratchet-tooth on segment 38, and 53 the pawl pertaining to segment 38.

If any one of the pins be pushed forward to active position, then shaft 48 will be rocked through the medium of such one of arms 49 as pertained to the pin which was put into action. When the main shaft is at rest, then cam 51 is idle, as seen in Fig. 10, so as not to interfere with the rocking of shaft 48, but as the shaft turns and nears the end of its turn and the active pin or pins are to be restored then cam 51 rocks shaft 48 back to normal position and restores any pin or pins which have been pushed into action.

*Pad-feeding devices*, (see Figs. 13 to 17, inclusive.)—In the drawings, and giving particular attention to Fig. 13, 54 indicates a carriage sliding in the frame of the machine to carry the material which is to be impressed, which material will be herein termed the "pad," this carriage moving in such direction as to carry the pad across the machine between the type-case and the anvil; 55, a cross-slide on this carriage to permit the pad to be adjusted to and from the type-case; 56, a vertical slide on cross-slide 55; 57, the pad-holder proper, removably held in vertical slide 56 and carrying the pad 17; 58, pawl-and-ratchet mechanism carried by cross-slide 55 and serving as means for vertically adjusting vertical slide 56 and the pad, all of the parts just described being in substantial correspondence with Heath's patent, No. 553,986, of February 4, 1896; 59, a slot in the top of the box-like frame of the machine between face-plate 8 and anvil 7 and furnishing space for the proper movements of pad 17; 60, the general frame of the machine; 61, a series of four racks secured to pad-carriage 54; 62, a feed-shaft mounted in the main frame at right angles to the path of movement of the pad-carriage; 63, (see Fig. 17,) four gears, of varying size, loose on shaft 62 and gearing, respectively, with rack 61, these gears having their hubs longitudinally grooved to receive a clutch-pin, as is usual in what is known as "cone-gearing;" 64, a clutch-rod sliding axially in shaft 62; 65, a clutch-pin carried by this rod and adapted, by sliding the rod, to be put into engagement with the clutch-groove in the hub of either of gears 63, so as to lock the given gear to the shaft, leaving the other gears loose on the shaft; and 66, shifting mechanism for sliding rod 64 and engaging the clutch-pin with any given one of the gears, as is usual in cone-gearing.

If shaft 62 be turned through a unit angle, the carriage will be moved a unit distance and the extent of that unit distance will depend upon which one of gears 63 is clutched to the shaft. One font of type may call for a greater feed unit than another font, and the arrangement of cone-gearing makes provision for four selective feed units for the carriage. When the font of type is changed in the machine by putting in a new type-case, then clutch-shifter 66 is so set as to bring into action such one of gears 63 as is appropriate to that font of type.

Attention is here directed to Heath's patent, No. 483,252 of September 27, 1892, for a typographic machine, and particularly to that portion of the description thereof given under the heading of "Horizontal travel of the pad," which refers to the quick return of the pad to the starting-point after a line of work has been completed. The same principle of action and substantially the same construction of mechanism are employed for this purpose in my present machine, and the reference will therefore permit of extremely brief description here.

Referring again to Fig. 13 of the drawings, 67 indicates the back feeding-shaft geared to carriage 54, and 68 the backing-pulley on this shaft.

The backing-pulley 68 is of the frictional slipping type of Heath's patent above mentioned and is always in motion in a direction tending to move the carriage to the right, the pulley, however, slipping with reference to shaft 67, but being always ready when permissive devices go into action at the end of a line of work to quickly move the carriage to the right, all as in Heath's patent just above mentioned.

Referring again to the drawings, 69 indicates a feed-shaft geared to shaft 62; 70, a ratchet-wheel fast upon shaft 69, each of its teeth representing a unit of feed motion for the pad; 71, a pawl-carrying arm for this ratchet-wheel; 72, a spring-pawl carried by this arm and held normally out of engagement with the ratchet-wheel; 73, a series of sliding pins, twelve in the exemplification, adapted to be selectively pushed into the path of pawl 72; 74, a series of levers for pushing pins 73 into active position, there being one lever for each pin; 75, a spring stop-pawl engaging ratchet-wheel 70 and preventing the retreat of the ratchet-wheel after it has been fed forward by pawl 72; 76, a feed-cam on the main shaft 21, adapted as the shaft makes its turn to give to pawl-arm 71 a forward stroke corresponding with twelve teeth of the ratchet-wheel and then to return the arm to normal position; 77, a cam-arm operated by this cam, and 78 a link connecting cam-arm 77 with pawl-arm 71.

At each impulse of the machine pawl 72 moves forward its full stroke and then returns. If all of pins 73 are in normal idle position, then pawl 72 will not engage the ratchet-wheel at all and no feed motion will be imparted to the wheel. The operation of pins 73 is similar to that of the series of pins which have been heretofore described in connection with the type-case movements, and it will be obvious that provision is made for causing the ratchet-wheel to be fed forward from one to twelve teeth by putting into action a selected one of pins 73. A given type-key is to be in connection with an appropriate one of levers 74, as hereinafter more fully explained, so that when the given type is called into action such one of pins 73 will become active as is appropriate to the given type, and where it is desired to produce feeding motions without impression of type it may obviously be effected by means of special finger-keys connected with levers 74, as will be later explained.

Stop-pawl 75 prevents retreat of the ratchet-wheel, and if at any time it be desired that the carriage shall move backward, under the influence of the carriage-backing devices heretofore referred to, it is only necessary to release stop-pawl 75. This release may be effected at the pawl itself, but it is preferable that the pawl be connected with a special finger-key in the keyboard, so that by depressing the key the carriage will immediately move back, regardless of whether the main shaft be in motion or not, it being remembered that the backing motion is independent of the active impulses of the machine.

Continuing with the drawings, 79 indicates a scroll-thread formed on the face of ratchet-wheel 70; 80, a stop-lug projecting from the face of the wheel, and 81 a pivoted stop mounted on the main frame and adapted to be engaged by stop-lug 80 and having its hub toothed to engage thread 79.

When the carriage is in extreme back position, representing the beginning of a line, stop-lug 80 bears against stop 81, thus preventing further back motion of the ratchet-wheel. As the wheel turns forward the stop-lug leaves stop 81; but it is obvious that if stop 81 were immovable then it would interfere with the ratchet-wheel making more than one forward turn, and indeed would prevent its making one complete forward turn, while the length of line of work to be provided for might require that the ratchet-wheel make several complete turns. As stop-lug 80 moves away from stop 81 as the ratchet-wheel turns forward stop 81 is caused by the scroll-thread to turn out of its normal position and out of the path of stop-lug 80, thus permitting the stop-lug 80 to freely pass the normal stopping position. By this means several forward turns of the ratchet-wheel are permitted, and when the ratchet-wheel turns back then stop 81 will at proper time take up its active position in the path of stop-lug 80 and become effective at extreme limit of backing motion of the carriage.

Continuing with the drawings, Figs. 14 and 15, 82 indicates a lever having an arm bearing against the rear ends of all of pins 73; 83, a portion on feed-cam 76 adapted to operate lever 82; 84, Fig. 13, the general group of finger-keys arranged in ranks and rows corresponding with the arrangement of type in the type-case, there being, however, at the right and at the left an extra row not pertaining to type; 85, the extra row of keys to the right, and 86 the extra row of keys to the left, twelve of these extra keys being appropriated to feeding motion where no type is involved, and one of the extra keys being appropriated to the operation of stop-pawl 75, and the other extra key being devoted to starting the main shaft, where neither feeding or type action is required.

When any given one of pins 73 is pushed into action, then lever 82 yields. As the main shaft makes its turn then cam portion 83 acts on lever 82 and restores the active pin to normal position, and in doing so will obviously restore the given one of levers 74 and the finger-key which operated it to normal position.

*Stop-and-start mechanism,* (Figs. 18 to 21, inclusive.)—In my Patent No. 553,983, of February 4, 1896, is set forth a friction clutch-pulley provided with an arm, the pulley being unlocked from the shaft so long as the arm is held and locking to the shaft when the arm is released, the holding and releasing of the arm being effected by moving a pin into or out of the path of rotation of the arm. In the figures of drawings now under consideration, 87 indicates a stop-clutch on main shaft 21 and preferably of the type set forth in the patent just referred to; 88, the arm carried by the clutch for locking it to and unlocking it from the shaft; 89, a pulley portion carried by the pulley of the stop-clutch, and therefore always in motion so long as the driving-belt is running to serve in transmitting continuous rotary motion by belt to slip-pulley 68, Fig. 13, of the pad-backing mechanism; 90, the stop-pin for the stop-clutch, sliding in the main frame of the machine and projecting normally into the path of rotation of clutch-arm 88, so that the clutch is held unlocked from the shaft and capable of retreat to permit the clutch to lock to the shaft and remain so till released by the stop-pin again arresting the clutch-arm; 91, a spring on the stop-pin tending to retract the pin and release the clutch-arm 88; 92, a stud projecting transversely from stop-pin 90; 93, a lever with its heel pivoted to the main frame, the body of the lever lying behind pin 92, so that the outward movement of the free end of the lever will cause an outward movement of the stop-pin; 94, a projection inwardly from lever 93; 95, a disk carried by the main shaft, its outer face engaging against projection 94, and thus preventing the retreat of the stop-pin; 96, a recess in the face of disk 95 to permit the retreat of projection 94 when the stop-pin is to be retracted, this recess being so located in the disk as to come opposite projection 94 when the main shaft is in its normal position of rest, with the stop-clutch unlocked from it; 97, a trigger-lever pivoted to the main frame of the machine, its outer end engaging behind the free end of lever 93, so that when the stop-pin is out in active position it is there held by the trigger-lever; 98, a rock-shaft extending across the machine under the keyboard; 99, a bail-rod carried by arms on this rock-shaft and extending the length of the rock-shaft; 100, an arm projecting from rock-shaft 98 rearwardly above the main shaft; 101, a link connecting arm 100 with trigger 97, and 102 a disk on the main shaft under the free end of arm 100, this disk having such diameter that when its periphery is engaged by arm 100 the trigger 97 will be held in normal active position down behind lever 93, the disk having in its periphery a notch which will permit the descent of the free end of arm 100 a distance corresponding with the releasing movement of the trigger, this notch standing opposite the end of arm 100 when the main shaft is in normal stationary condition.

Normally the pulley of the stop-clutch 87 is in continuous motion by belt, but is unlocked from the shaft and held so by the engagement of stop-pin 90 with clutch-arm 88, the stop-pin being held out against the resistance of spring 91 by trigger 97. Under these conditions the main shaft is at rest in normal idle position. If now by any means shaft 98 be rocked, then trigger 97 will be released and the stop-clutch will instantly retreat under the influence of spring 91, thereby releasing clutch-arm 88 and permitting the stop-clutch to become locked to the shaft, the shaft thus beginning a rotation. Clutch-arm 88 passes stop-pin 90 the instant the stop-pin retreats; but almost instantly the stop-pin is again protruded by the cam-like action of recess 96 in disk 95, the face of the disk holding the stop-pin in protruded position, so that upon the completion of the rotation of the shaft the clutch-arm 88 will be again arrested by the stop-pin and the clutch unlocked and the main shaft brought to rest. Trigger 97 descends behind lever 93 and prevents the retreat of the stop-pin when the recess 96 reaches normal position. It will be obvious from Fig. 20 that the notch in disk 102 permits the descent of arm 100 and the release of the trigger when the main shaft is in normal position of rest, but that shortly after the shaft begins a rotation the disk will raise arm 100 and again set the trigger behind lever 93. The finger-keys of the machine, whatever other office they may perform, are arranged to act on bail-rod 99 and thus rock arm 100, the system of connection being later explained. Thus the depression of any finger-key releases trigger 97 and permits the stop-pin to retreat and the clutch to lock to the shaft and turn the shaft, the stop-pin promptly returning to active position to unlock the clutch at the end of one rotation, the trigger preventing the retreat of the stop-pin until a second action through the medium of a finger-key.

*Plunger movement,* (Figs. 5, 8, 13, and 22.)— 103 indicates a cam fast on the main shaft under the plunger 6; 104, a toggle connected with the plunger and main frame, the toggle being normally flexed to hold the plunger in its rearmost position, in which position its hook, as heretofore explained, is in line with the notches in the type; 105, a bell-crank pivoted to the main framing and having one of its arms engaging cam 103, and 106 a link connecting the other arm of the bell-crank with the plunger-toggle.

Normally when the shaft is at rest the parts are in the position shown in Fig. 22. At the proper time in the turn of the main shaft the cam causes the plunger to make its impression-stroke and then to return again to normal position.

*The shock-arrester,* (Figs. 8 and 23.)—107 indicates a cylinder supported by the main frame under the main shaft; 108, a piston therein; 109, a cam on the main shaft over the cylinder; 110, connections from the cam to the piston, whereby the turning of the cam reciprocates the piston; 111, an inwardly-opening inlet-valve to the cylinder below the piston, and 112 an adjustable outlet-valve from the cylinder below the piston.

In the operation of the general machine the turning of the main shaft is required to produce short but rapid movements of various parts independently, and when all the functional movements of the parts have been produced by the main shaft and the parts have been returned to normal position, then the main shaft must come to rest accurately and sharply. The inertia of the shaft and the parts carried by it is apt to result in annoying shocks at the instant the shaft comes to rest. Fig. 23 indicates the position of the shock-arresting piston when the shaft approaches normal position of rest while turning at regular rate. At this time the cam will quickly depress the piston against the resistance of the air confined within the cylinder, the air under compression leaving the cylinder under resistance regulated at valve 112. By this means the motion of the shaft is elastically resisted when its momentum would otherwise tend to produce a shock upon arrest. When the shaft starts from its position of rest, the cam raises the piston, and the cylinder freely fills with air through valve 111 and becomes charged ready with cushioning-air for use at the termination of the rotation of the shaft. The degree of cushioning effect is regulated at valve 112.

*Type-key construction*, (Figs. 13, 24, and 26.)—113 indicates parallel bars disposed fore and aft in the front upper portion of the framing of the machine and forming a skeleton keyboard; 114, a ledge disposed at the side of each bar to form a key-stop; 115, the individual type-keys mounted on pivots in the sides of bars 113, seven keys on each bar, corresponding with the vertical rows of type in the type-case, the keys having a general bell-crank form, the finger-pads being on the upper arms, and the lower arms projecting down below the bars 113 to operate mechanism below the keyboard, the keys being each provided with an intermediate arm to engage ledge 114 as a stop when the keys are in normal position; 116, a rod disposed along the side of the lower arms of the row of finger-keys mounted on a bar 113 and capable of endwise motion, there being a bar 113 with its row of type-keys and its rod 116 for each of the vertical rows of type in the type-case—that is to say, ten rows at each side of the center, the keyboard so far as type-keys are concerned thus corresponding with the type-case and the individual type-keys corresponding in relative position with the individual type in the type-case; 117, a link rocking on a pivot supported by bar 113, its upper end being pivoted to rod 116; 118, a similar link supporting the other end of rod 116, but continued downwardly below its pivot, so as to form a rocking lever, it being understood that each of rods 116 is thus mounted upon rocking links; 119, pins projecting from the side of rods 116 and engaging in the rear of the lower arms of the finger-keys, whereby the depression of any finger-key of a transverse row will cause the rearward movement of rod 116 pertaining to that row and the consequent rocking of link-lever 118 pertaining to that row, and 120 a lug projecting downwardly from each of rods 116 and engaging in front of bail-rod 99 of the starting mechanism heretofore described.

*Key action on the stop-clutch*, (Figs. 18, 19, 20, 21, and 24.)—It will be obvious that if any type-key be depressed it will result in the rearward movement of one of rods 116 and the consequent rocking of shaft 98, thus causing the depression of lever 100, which releases the starting-trigger and causes the stop-clutch to lock to the main shaft and start the shaft into motion. Thus the depression of any key starts the main shaft, and it will be remembered that as the main shaft completes its turn the disk 102 raises lever 100 to normal position, and it will be obvious that the consequent movement of bail-rod 99 will push rearwardly upon the displaced rod 116, thus restoring it to normal position.

*Key action on tray-shifting*, (Figs. 24 and 27.)—It is to be remembered that the degree of tray-shifting is controlled by pins 26 and 34, Fig. 7, one group of the pins pertaining to shifting to the right hand and the other group pertaining to shifting to the left hand, and that the type-keys on the keyboard correspond in relative position with the type in the type-case, there being a left-hand group and a right-hand group of type-keys, each group comprising ten rows of seven keys each, the innermost row calling for one degree of tray-shifting and the outermost row calling for ten degrees. Referring to Figs. 24 and 27, 121 indicates a group of ten shift-shafts extending across under the left-hand portion of the keyboard and journaled in the main framing; 122, an arm on each of these shafts; 123, links connecting these arms with the pins 34, which control the rightward shifting of trays to bring to position type at the left of the tray, each of the pins thus being connected to an individual shift-shaft 121; 124, a second arm on each of shift-shafts 121; 125, links connecting each of arms 124 with one of rocking links 118, the arrangement being such that rocking link 118 pertaining to the innermost row of type-keys of the group has connection with that one of pins 34 pertaining to one degree of tray-shifting, that one of rocking links 118 pertaining to the outermost row of type-keys having connection with that one of pins 34 pertaining to ten degrees of tray-shifting, and correspondingly with intermediate rows of type-keys, and 126 a second group of ten shift-shafts disposed under the right-hand portion of the keyboard and similarly arranged with reference to the right-hand group of type-keys and the corresponding group of shift-controlling pins 26.

Depressing any type-key of the innermost group at the left of the keyboard results in pushing into active position that one of pins 34 which determines that the tray-shifting effect shall be limited to one degree in extent. If a type-key in the outermost or tenth row be depressed, it will push to active position that one of pins 34 pertaining to ten degrees of tray-shifting motion, and correspondingly with type-keys in the intermediate rows. Thus the depression of any type-key in the left-hand portion of the keyboard operates on an appropriate one of pins 34 and properly admeasures the degree of tray-shifting to the right to bring to proper position type in the left-hand portion of the trays. Type-keys in the right-hand portion of the keyboard correspondingly operate on pins 26, pertaining to leftward shifting of trays, to bring to position type in the right-hand portion of the trays.

*Key action on vertical motion of type-case,* (Figs. 25 and 28.)—Let it be remembered that the normal position of the type-case is such that its middle tray is at the impression-level, thus calling for no vertical adjustment of the type-case when type in that tray are to be brought into action, lower trays requiring the type-case to be raised and upper trays requiring it to be lowered. Referring to Figs. 25 and 28, 127 indicates six shafts extending under the whole length of the keyboard, one shaft for each rank of type-keys except the middle rank, which pertains to the middle type-tray; 128, a bail-rod carried by arms on each of these shafts and lying just to the rear of the lower arms of the rank of type-keys to which the given shaft pertains, so that the depression of any type-key in a given rank will rock an appropriate one of shafts 127; 129, an arm on each of shafts 127; 130, links connecting arms 129 appropriately with pins 41 and 47, which control the degree of vertical adjustment of the type-case, each rank of type-keys except the middle one thus having connection with one of these controlling-pins, and 131 the arms on shafts 127 to carry the bail-rods 128.

Depressing any finger-key of the middle rank of keys will have no effect on pins 41 or 47, that row of keys pertaining to the middle tray calling for no vertical adjustment of the type-case. Depressing any key in any other given rank of type-keys will result in an appropriate one of pins 41 or 47 being pushed into action, the result being that the type-case will be raised or lowered and to a degree corresponding with the rank containing the depressed key, three of the ranks of keys being connected with pins controlling the degree of raising for the type-case, and three of the ranks being connected with pins for controlling the degree of lowering of the type-case.

*Type-key action on feed-measure,* (Figs. 29, 30, and 31.)—The extent of pad-feed, from one to twelve units, is controlled by pins 73, Fig. 14, each pin determining a different number of feed units as being involved in the impulse of the machine, each pin having an individual lever 74, by means of which it is pushed to active position. In Figs. 29, 30, and 31, 132 indicates a group of twelve feed-shafts extending along under the whole length of the keyboard; 133, arms on one end of these shafts in the general vertical plane of feed-controlling pins 73; 134, links connecting each of arms 133 with one of levers 74, so that the rocking of any one of the feed-shafts 132 will result in pushing one of pins 73 to active position; 135, arms upon feed-shafts 132 below the rows of type-keys, and 136 links appropriately connecting arms 135 with the lower extremities of link-levers 118.

Each of feed-controlling pins 73 has its individual feed-shaft 132. A given row of type-keys pertains to type calling for a uniform number of feed units, and under such row of type-keys the feed-shaft pertaining to that number of feed units is to be provided with one of arms 135, which arm is to have a link connection 136 to the link-lever 118, pertaining to the given row of type-keys. One feed-shaft may thus have connection with several rows of type-keys calling for the number of feed units pertaining to that feed-shaft. Therefore the depression of any type-key will cause the rocking of an appropriate feed-shaft and the pushing into action of an appropriate one of pins 73 to control the number of feed units to be involved in the pad motion at the impulse of the machine resulting from the depression of that key.

Links 136 act tensionally only, arms 135 being capable of moving forwardly independent of the links. This permits the rocking of a given feed-shaft by the action of a type-key in one row uninterfered with by the connection between that same shaft and some other row or other rows of type-keys.

*Space-key action,* (Figs. 13, 29, 30, 32, and 33.)—In Fig. 13, as before explained, the outer rows 85 and 86 of keys provide twelve spacing-keys for the various degrees of pad-feeding without impression of type. It is their duty when used simply to adjust an appropriate one of feed-measuring pins 73 and then to start the stop-clutch. At the left-hand end of the keyboard in key-row 86 six of the keys pertain to space-feeding from one to six units, and at the right-hand end of the keyboard in row 85 are six keys appropriated to space-feeding from seven to twelve units. Referring to Figs. 13, 32, and 33, 137 indicates arms attached to that six of the feed-shafts 132 pertaining to feeds of from one to six units, these arms being disposed below row 86 of finger-keys; 138, links connecting each of these six arms with one of the finger-keys in row 86; 139, arms on the other six feed-shafts and disposed below the right-hand row 85 of finger-keys, and 140 links connecting these latter arms with six of the finger-keys in row 85. The depression of any one of the twelve finger-keys thus connected by links 138 and 140 with the feed-shafts will obviously result in the rocking of an appropriate feed-shaft and the pushing into action of an appropriate one of feed-measuring pins 73, the action of these keys on the determination of degree of pad-feed thus being the same as the type-keys, and it is to be observed, in Figs.

32 and 33, that these keys thus appropriated to spacing act on rods 116 to actuate bail-rod 99 and start the stop-clutch. The spacing-keys are thus like the type-keys, except that they do not operate on any mechanism for controlling the vertical movement of the type-case, and their rocking links 118 have no downward lever extension to connect with mechanism for controlling the tray-shifting motions.

*Starting finger-key*, (Fig. 32.)—It is often desirable to cause the machine to make an impulse without the impression of type or the production of pad-feed—as, for instance, in first starting up the machine after it has been standing for some time. Referring to Figs. 13 and 32, 141 indicates a finger-key in left-hand row 86, which key may be termed the "starting-key."

Key 141, it will be observed, has connection only with one of pins 119 in rod 116, the movement of which rod under the action of any finger-key connected with it starts the stop-clutch by moving bail-rod 99. Hence if key 141 be depressed the stop-clutch will be started and the machine make an impulse without movement of the type-case and without movement of a tray or type and without feeding movement of the pad.

*Pad-backing finger-key*, (Figs. 13, 14, 33, and 34.)—It has been heretofore explained under the heading "Pad-feeding devices" that the pad feeds forward as the work progresses against the resistance of the constantly-energized pad-backing mechanism operated by pulley 68, stop-pawl 75, Fig. 14, preventing the retreat of the feed ratchet-wheel. If at any time when the ratchet-wheel is not feeding forward stop-pawl 75 be released, then the pad-backing mechanism will produce the retreat of the pad. The stop-pawl 75 may be released by direct handling, but it is desirable to operate it from the keyboard. Referring to Figs. 13, 33, and 34, 142 indicates a finger-key in right-hand row 85, which key is the pad-backing key; 143, a bell-crank pivoted to the main framing of the machine; 144, a link connecting key 142 with one arm of this bell-crank, and 145 a link connecting the other arm of this bell-crank with stop-pawl 75, the bell-crank and links forming merely an exemplifying system of connection between the key and pawl.

If key 142 be depressed, the stop-pawl 75 will be released and the pad-backing mechanism will at once move the carriage back to initial position. The operation of this key results in no starting of the main shaft and in no active impulse of the machine, the pad-backing mechanism being always under working strain and tending to retract the carriage whenever such retracting motion is permitted by stop-pawl 75.

Figure 35:
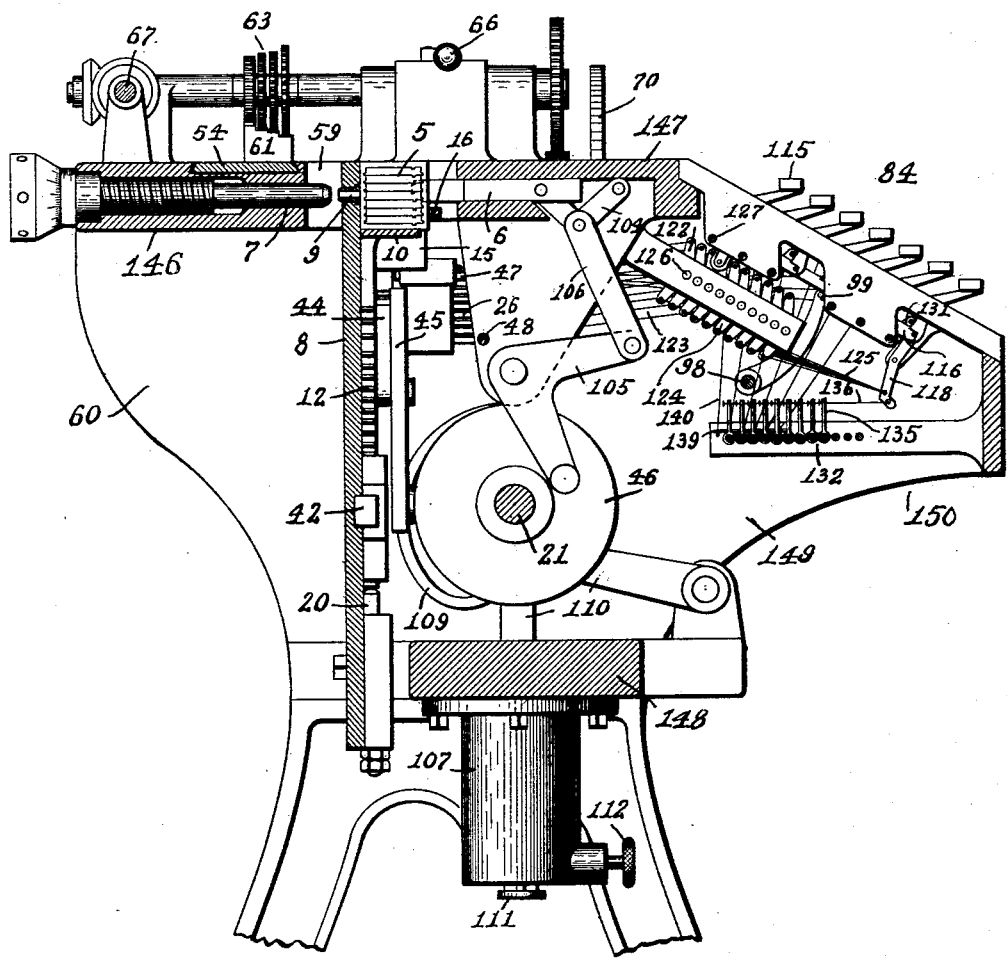

*General assemblage*, (Figs. 13 and 35.)— The motion work has been described in detail, general fixed frame parts having been indicated by the numeral 60, these frame parts being of a character and disposition to give proper support to the moving devices; but beyond this question of mere proper support there remains the consideration of convenience in operation of the parts, general accessibility, and strength of structure. In Fig. 35, 146 indicates that portion of the main framing at the rear of slot 59 in which the pad travels, and consisting of a beam disposed horizontally at the level of the plunger and supporting the impression-anvil 7 in the form of an adjusting-screw passing forwardly through portion 146; 147, that portion of the top of the general frame forward of slot 59 and having also the form of a horizontally-disposed beam opposite beam 146 and furnishing a housing for the plunger 6; 148, a horizontally-disposed beam portion of the general framing disposed some distance below top beam 147; 149, the ends of the main framing joining the three beam portions, and 150 a box-like projection at the front of the main framing to give support to the keyboard-bars and general keyboard mechanism.

The main shaft 21 is journaled in the main frame between beams 147 and 148, the parts carried by it being accessible from the open front of the frame. Face-plate 8 is removably secured to the framing at the rear edge of beams 147 and 148, the mechanism carried by it being generally accessible from the open front of the frame, the removal of the face-plate and its attached mechanism being readily effected. The mechanism under the keyboard is accessible from below, and the connection between this keyboard mechanism and that mounted on the face-plate is by means of simple transmitting-links. This system permits either group of mechanism to be conveniently dealt with in case adjustments or repairs are needed. The strains of type impression are met by the two top beams 146 and 147. The carriage 54 slides longitudinally in the rear beam. The shock-arresting cylinder 107 is supported below lower beam 148. The keyboard-bars on which the finger-keys are mounted are removably attached by screws to the forwardly-projecting portion of the main framing, and any bar, together with the mechanism mounted on it, can be independently removed from the keyboard, and all may be removed to give access to the transmitting mechanism mounted in the frame below the keyboard.

*General operation*, (Fig. 13.)—It is to be understood that clutch-pulley 87 is in constant motion, but normally unclutched from the shaft, the shaft being at rest, and that slip-pulley 68 is always in motion, slipping with reference to but always tending to turn shaft 68 and move the carriage to the right. By depressing starting-key 141 the stop-clutch will become locked to the main shaft and cause the shaft to make one turn and then come to rest. This turn of the shaft will have produced an advance of the plunger, but idly and free from engagement with any type. The various pawl-carrying arms tending to move the type-case vertically and to slide the shifting-blades and to advance the feed ratchet-wheel will by this turn of the shaft have been put through their functional motions without performance of function, no controlling-pins having been advanced to cause their pawls to go into action. In short, the machine has made an idle impulse. Assume now that one of the spacing-keys be depressed—say the one pertaining to six units of feed. The result will be the pushing into action of the six-units feed-controlling pin and the subsequent starting of the stop-clutch, whereupon the shaft will make one turn idly, as before, except that the carriage-feeding mechanism will become effective in advancing the carriage six units of feed to the left; and in this way, by the depression of spacing-keys, successive impulses can be given to the machine, the functional effect of each impulse being only to advance the carriage to the left a distance corresponding with the number of feed units pertaining to the depressed key. The completion of the turn of the main shaft brings all parts to normal position and restores such feed-controlling pin as may have been pushed into active position. Assume now that we depress the type-key at the left-hand end of the middle rank of keys, this being the tenth key from the center of the keyboard. The depression of this key results in pushing into action the lowermost one of pins 34, Fig. 7, and the subsequent locking of the stop-clutch, so that the shaft begins its turn, the tray-shifting blades, Fig. 7, moving to the left and shifting the middle type-tray ten degrees and bringing its outermost type into engagement with the plunger, the shifting-blades becoming locked by lock-bar 36, after which the plunger makes its stroke, pushing the type back out of the tray and impressing it upon the pad, the plunger then returning and restoring the type to the tray, which action is followed by the release of the lock of the shifting-blades and the return of the shifting-blades to normal position, thus restoring the displaced type-tray. The depression of this type-key also pushed into action that one of the feed-controlling pins pertaining to the degree of feed proper for that type, the result being that after the impression of the type the carriage will be moved to the left the proper number of feed units. In a similar manner the depression of any other type-key in the middle rank and at the left of the keyboard will have produced an appropriate shifting of the tray and the adjustment of an appropriate feed-controlling pin. Keys in the middle rank and at the right hand of the keyboard produce similar effects, except that the type-tray will move to the left to bring right-hand type to the impression-line.

In the operation just referred to the middle tray was dealt with, calling for no vertical adjustment of the type-case. Assume now that the outermost left-hand type-key of the rearmost rank be depressed, calling for three degrees of lifting of the type-case, to bring the lowest tray to position and the shifting of that tray ten degrees to the right to bring its endmost type to position. The effect of the depression of this key is to push into action the right-hand one of pins 41 and the lowermost one of pins 34, Fig. 7, and to push out a feed-controlling pin appropriate to the type represented by that key and then to start the main shaft. The turn of the main shaft results in the raising of the type-case three degrees, and then the locking of the type-case carrier in adjusted position, and then the shifting of the lowest tray ten degrees to the left, and then the action of the plunger and feed devices, as before explained, the turn of the shaft eventually restoring all of the parts to normal position. The same principle of action obtains with reference to any of the type-keys of other than the middle rank. Thus the depression of any type-key results in a single impulse of the machine, producing an impression of the appropriate type and the advance of the pad an appropriate distance ready for the next impression.

At the end of a line of work the pad-backing key 142 may be depressed, the result being no active ordinary impulse of the machine, but a mere release of the stop-pawl, which permits slip-pulley 68 to become effective in fleeting the carriage back for the beginning of a new line of work.

When for any reason a change of fonts is desired, it is only necessary to remove the type-case from its carrying-shelf and substitute a second proper type-case, each type-case containing when arranged as in the exemplification a font of one hundred and forty characters.

In changing fonts the type in a substituted type-case may or may not call for the same fundamental unit of feed-measure as the font previously in use. If the feed-measure of the substituted font is the same as that of the previously-employed font, then no change is required in the feed mechanism. If, however, the feed-measure is different, then handle 66 is adjusted to bring into action that one of gears 63 appropriate to the type-font in hand, it being understood of course that gears 63 are arranged as regards number and proportion with reference to the varying degrees of feed-measure required in the general system of fonts employed on the machine.

The carriage accessories to provide for the convenient holding of the pad material and for its convenient vertical adjustments may be as in former machines, detailed description being here omitted, as the present patent is not concerned with their novelty. The machine will also be preferably provided with an indicator to show the degree of carriage advance, &c., as in my Patent No. 483,252, heretofore referred to.

I claim as my invention—

1. In a typographic machine, the combination, substantially as set forth, of a horizontally-sliding type-tray, a sliding blade engaging the same, a ratchet-toothed segment connected with said blade and mounted on a pivot, a lever mounted on said pivot, a pawl carried by said lever and adapted to engage said ratchet-teeth, a series of pins normally out of but adapted to be selectively moved into the path of said pawl, a cam arranged to actuate said lever, and finger-keys connected with said pins.

2. In a typographic machine, the combination, substantially as set forth, of a horizontally-sliding type-tray, a pair of sliding blades engaging the same, a pair of ratchet-toothed segments connected with said blades and having their ratchet-teeth facing in opposite directions, levers mounted on pivots with said segments, a pawl carried by each lever and adapted to engage the ratchet-teeth of its appropriate segment, a series of pins at each pawl and arranged to be normally out of but to be pushed into the paths of the pawls, cams arranged to rock said levers simultaneously in opposite directions, and finger-keys connected with said pins.

3. In a typographic machine, the combination, substantially as set forth, of a horizontally-sliding type-tray, a sliding blade engaging the same and provided with lock-teeth, a ratchet-toothed segment connected with said blade, a lever mounted on a pivot with said segment, a pawl carried by said lever, a series of pins normally out of but adapted to be pushed into the path of said pawl, a sliding lock-bar having a tooth adapted to engage the lock-teeth of said blade, a spring holding said lock-bar to inactive position, a connection from said lock-bar adapted to be engaged by said lever at the end of its stroke, and a cam arranged to move said lever.

4. In a typographic machine, the combination, substantially as set forth, of a horizontally-sliding type-tray, a sliding blade engaging the same and provided with lock-teeth, a ratchet-toothed segment connected with said blade, a lever mounted on a pivot with said segment, a pawl carried by said lever, a series of pins normally out of but adapted to be moved into the path of said pawl, a sliding lock-bar having a tooth adapted to engage the lock-teeth of the blade, a spring holding the lock-bar normally out of locking action, a sliding segment engaging a shoulder on said lock-bar and adapted to be engaged by said lever as the lever completes its active stroke, and a cam arranged to move said lever.

5. In a typographic machine, the combination, substantially as set forth, of a horizontally-sliding type-tray, a sliding blade engaging the same and provided with lock-teeth, a ratchet-toothed segment connected with said blade, a lever mounted on a pivot with said segment, a pawl carried by the lever, a series of pins normally out of but adapted to be moved into the path of the pawl, a lock-bar having a tooth adapted to engage the lock-teeth of the blade, a spring holding the lock-bar out of action, a block upon the face of the lock-bar, screws engaging said block and lock-bar and having tapering bodies engaging tapering holes in the block and having threaded portions engaging threaded holes in the bar a greater distance apart than said tapering holes, a sliding segment engaging said block and adapted to be engaged by said lever as the lever completes its active stroke, and a cam arranged to give motion to said lever.

6. In a typographic machine, the combination, substantially as set forth, of a ratchet-toothed segment mounted on a pivot, connection therefrom to a part to be moved a variable distance and then returned to normal position, a lever mounted on the pivot of said segment, a pawl carried by said lever, a series of pins normally out of but adapted to be moved into the path of said pawl, a cam arranged to move said lever, and a spring-plunger disposed between said lever and segment to form the connection between them on the returning stroke of the lever.

7. In a typographic machine, the combination, substantially as set forth, of a vertically-sliding type-case carrier, a ratchet-toothed segment connected therewith and mounted on a pivot, a lever mounted on said pivot, a pawl carried thereby, a series of pins normally out of but adapted to be moved into the path of said pawl, and a cam arranged to move said lever.

8. In a typographic machine, the combination, substantially as set forth, of a vertically-sliding type-case carrier, a pair of ratchet-toothed segments connected therewith, a lever mounted on a pivot with each segment, a pawl carried by each lever, a series of pins at each pawl and normally out of but adapted to be moved into the path of the pawl, and cams arranged to move said levers in the same direction simultaneously.

9. In a typographic machine, the combination, substantially as set forth, of a vertically-sliding type-case carrier provided with lock-teeth, a bolt sliding transverse to the movement of said carrier and having lock-teeth, a spring holding said bolt normally out of action, a ratchet-toothed segment connected with said carrier, a lever mounted on a pivot with said segment, a pawl carried thereby, a series of pins normally out of but adapted to be moved into the path of said pawl, and a cam arranged to move said lever and throw said pawl to locking position at the termination of the active stroke of the lever.

10. In a typographic machine, the combination, substantially as set forth, of a vertically-moving type-case carrier, a spring-plunger supporting the same, a pair of ratchet-teeth segments connected with the carrier, a lever mounted on a pivot with each of said segments, a pawl carried by each lever, a series of pins at each pawl and normally out of but adapted to be moved into the path of the pawl, and cams arranged to give movement to the levers.

11. In a typographic machine, the combination, substantially as set forth, of a vertically-moving type-case carrier, a pair of connected tray-shifting blades arranged to slide transverse to the movement of said carrier, a pair of ratchet-toothed segments connected with said carrier, a pair of ratchet-toothed segments connected with said blades, a lever mounted on a pivot with each segment, a pawl carried by each lever, a series of pins at each pawl and normally out of but adapted to be moved into the path of the pawl, and cams arranged to give movement to the levers.

12. In a typographic machine, the combination, substantially as set forth, of a face-plate, a type-case carrier mounted for vertical movement in fixed guides on said face-plate, tray-shifting blades mounted for horizontal movement in fixed guides on the face-plate, mechanism mounted on the face-plate for giving motion to said carrier and blades, and a main shaft disposed parallel with said face-plate and having cams engaging said mechanism.

13. In a typographic machine, the combination, substantially as set forth, of a main framing, a removable face-plate disposed vertically therein, a type-case carrier mounted for vertical motion in fixed guides on the face-plate, tray-shifting blades mounted for horizontal motion in fixed guides on the face-plate, levers mounted on the face-plate for giving motion to said carrier and blades, a main shaft mounted in said framing parallel with said face-plate, and cams on said shaft and engaging said levers.

14. In a typographic machine, the combination, substantially as set forth, of a face-plate, a series of measuring-pins mounted to slide at right angles to the face of said face-plate, a shaft journaled in bearings on the front of the face-plate, arms thereon connected with said pins and adapted by the turning of the shaft to move the pins to normal position, a cam near said shaft, and a cam-arm on said shaft and engaged by said cam.

15. In a typographic machine, the combination, substantially as set forth, of a normally stationary main shaft, cams thereon, connections from said cams to reciprocating parts, a cylinder, a piston therein, a cam on said shaft arranged to give motion to said piston, an inwardly-opening valve to said cylinder, and a regulating outlet-valve from said cylinder.

16. In a typographic machine, the combination, substantially as set forth, of a normally stationary main shaft, a stop-clutch thereon and adapted to be unlocked therefrom by the arrest of an arm carried by the stop-clutch, a stop-pin adapted to arrest said arm, a spring tending to move said stop-pin to position of non-arrest, a lever to serve in moving the stop-pin to arresting position, a disk on the main shaft adapted to move the lever and stop-pin to arresting position and having a recess to permit the stop-pin to move to non-arresting position, a trigger engaging the lever and holding the stop-pin to arresting position, an arm connected with said trigger, a disk on the main shaft adapted to move and hold said arm to position corresponding with the active position of the trigger and having a notch to permit the arm to move the trigger to inactive position, and finger-key connections with said arm to serve in releasing said trigger.

17. In a typographic machine, the combination substantially as set forth, of a normally stationary main shaft, a stop-clutch thereon and adapted to be unlocked therefrom by the arrest of an arm carried by the stop-clutch, a stop-pin adapted to arrest said arm, a spring tending to move said stop-pin to position of non-arrest, a lever to serve in moving the stop-pin to arresting position, a disk on the main shaft adapted to move the lever and stop-pin to arresting position and having a recess to permit the stop-pin to move to non-arresting position, a trigger engaging the lever and holding the stop-pin to arresting position, an arm connected with said trigger, a disk on the main shaft adapted to move and hold said arm to position corresponding with the active position of the trigger and having a notch to permit the arm to move the trigger to inactive position, a shaft at the axis of said arm, a bail-rod carried by arms on said shaft, and finger-key connections with said bail-rod.

18. In a typographic machine, the combination, substantially as set forth, of a ratchet-wheel, a pawl-carrying arm, a pawl carried thereby and adapted for positively engaging and advancing said ratchet-wheel, a series of pins normally out of but adapted to be moved into the path of said pawl and thereby force the pawl into engagement with said ratchet-wheel, a lever engaging said pins and adapted to move them to normal position, and cams connected with said arm and said lever.

19. In a typographic machine, the combination, substantially as set forth, of a ratchet-wheel, a pawl-carrying arm, a pawl carried thereby to positively advance said ratchet-wheel, a series of pins normally out of but adapted to be moved into the path of said pawl, and a series of spacing-keys equal in number to said pins and individually connected therewith.

20. In a typographic machine, the combination, substantially as set forth, of a sliding carriage, a series of racks thereon, a shaft disposed at right angles to the path of movement of said carriage, pawl-and-ratchet mechanism for turning said shaft, a series of differently-sized gears loose on said shaft and engaging said racks, and a sliding clutch adapted to lock said gears alternatively to said shaft.

21. In a typographic machine, the combination, substantially as set forth, of a ratchet-wheel, pawl-and-ratchet mechanism for turning the same, a stop-pin carried by the ratchet-wheel, a scroll-thread carried by the ratchet-wheel, and a pivoted stop engaged by said scroll-thread and adapted to be turned into and out of the path of said stop-pin by the turning of the ratchet-wheel.

22. In a typographic machine, the combination, substantially as set forth, of a main framing, actuating mechanism mounted therein, sliding pins for varying the effect of the actuating mechanism, a series of parallel removable bars supported at the front of said main framing and forming a skeleton keyboard, a row of finger-keys pivoted on each of said bars, and connections from said finger-keys to said pins.

23. In a typographic machine, the combination, substantially as set forth, of a row of pivoted finger-keys, an endwise-movable bar disposed parallel with said rows of keys, pins projecting from said bar and engaged by said keys so that the depression of any key will move said bar endwise, an endwise-moving pin to admeasure the effect of the actuating mechanism of the machine, and connections from said bar to said pin.

24. In a typographic machine, the combination, substantially as set forth, of a series of parallel rows of finger-keys, a bar parallel with each row of keys and having pins engaged by the keys, pivoted links supporting the bars, a main shaft, a stop-clutch thereon, a rock-shaft having an arm to effect the locking of the stop-clutch to the main shaft, and a bail-rod carried by arms on said rock-shaft and engaged by lugs on all said bars.

25. In a typographic machine, the combination, substantially as set forth, of a series of parallel rows of finger-keys, a bar parallel with each row of keys and having pins engaged by keys, pivoted links, supporting the bars, a series of sliding pins to admeasure the effect of the actuating mechanism of the machine, a rock-shaft for each of said pins, links connecting each rock-shaft with its pin, and links connecting each rock-shaft with one of said bars.

26. In a typographic machine, the combination, substantially as set forth, of two groups of type-keys each group being formed of parallel rows of keys, a bar parallel with each row of keys, pivoted links to support the bars, a series of rock-shafts disposed below one group of keys and equal in number to the rows of keys in that group, a series of rock-shafts disposed below the other group of type-keys and equal in number to the rows of keys therein, connections from each rock-shaft to one of said bars, two series of sliding pins to admeasure the effect of the actuating mechanism of the machine, and a link connecting each pin with one of said rock-shafts.

27. In a typographic machine, the combination, substantially as set forth, of a row of pivoted type-keys, rock-shafts disposed below the keys and each carrying a bail engaged by a key, a series of pins to admeasure the effect of the actuating mechanism of the machine, and a link connection from each of said rock-shafts to one of said pins.

28. In a typographic machine, the combination, substantially as set forth, of a group of pivoted type-keys arranged in rows and ranks, rock-shafts disposed below the keys and each carrying a bail engaged by the keys of an appropriate rank, sliding pins to admeasure the effect of the actuating mechanism of the machine, and link connections from each of said rock-shafts to one of said pins.

29. In a typographic machine, the combination, substantially as set forth, of a sliding carriage, a ratchet-wheel geared thereto, a pawl-carrying arm, a pawl carried thereby, a series of pins normally out of but adapted to be moved into the path of said pawl, a group of finger-keys, a series of rock-shafts disposed below said group of keys and equal in number to said pins, connections from each of said shafts to one of said pins, and connections between the finger-keys and shafts.

30. In a typographic machine, the combination, substantially as set forth, of a vertically-sliding type-box, a series of superposed type-trays therein, a carrier for supporting said type-box and moving it vertically, an anvil to the rear of said type-box and at the level of the middle tray thereof, a plunger at the front of the type-box in line with said anvil, shifting-blades for sliding said trays and disposed at the level of the middle tray in the type-box, and mechanism for moving said carrier and blades and plunger.

31. In a typographic machine, the combination, substantially as set forth, of a main frame consisting of a pair of horizontal top beams united at their ends and having a slot between them, an anvil mounted in the rear one of said beams, a plunger mounted in the front beam in line with said anvil, a face-plate removably disposed vertically in said slot between said plunger and anvil and having a guiding-eye in line with the plunger and anvil, a type case and carrier mounted on the front of said face-plate, a main shaft journaled in the frame of the machine, transmitting mechanism connecting said shaft with said carrier and plunger, admeasuring devices to determine the effect of said transmitting devices upon said carrier, a group of keys mounted in a keyboard supported at the front of said frame, and connections between said keys and said admeasuring devices.

32. In a typographic machine, the combination, substantially as set forth, of a front top beam and rear top beam arranged in a common horizontal plane with a slot between them, a beam disposed below said front beam, frame ends uniting the ends of said three 5 beams, a main shaft disposed below said front top beam, a keyboard forward of said top beam, an anvil mounted in said rear top beam, a plunger mounted in said front top beam in line with said anvil, a carriage arranged to slide in said rear top beam, and a type-case 10 arranged to slide vertically between said two top beams.

THOMAS T. HEATH.

Witnesses:
PHILIP RENNER,
M. B. FERRIS.